United States Patent [19]

Iwano et al.

[11] Patent Number: 5,654,855

[45] Date of Patent: Aug. 5, 1997

[54] TAPE CASSETTE HAVING RIBS FOR REGULATING AXIAL MOVEMENT OF THE TAPE REELS

[75] Inventors: Kenji Iwano; Yoshinori Shiomi, both of Tsuyama, Japan

[73] Assignee: Matsushita Electric Industrial Co., Ltd., Osaka, Japan

[21] Appl. No.: 468,232

[22] Filed: Jun. 6, 1995

Related U.S. Application Data

[62] Division of Ser. No. 235,234, Apr. 29, 1994, Pat. No. 5,475,555, which is a continuation of Ser. No. 795,965, Nov. 21, 1991, abandoned.

[30] Foreign Application Priority Data

| Nov. 30, 1990 | [JP] | Japan | 2-338081 |
|---|---|---|---|
| Nov. 30, 1990 | [JP] | Japan | 2-338083 |
| Mar. 14, 1991 | [JP] | Japan | 3-049514 |

[51] Int. Cl.$^6$ ................................. G11B 23/087
[52] U.S. Cl. ................................. 360/132; 242/347
[58] Field of Search .................. 360/132; 242/345, 242/345.2, 347

[56] References Cited

U.S. PATENT DOCUMENTS

| 4,012,011 | 3/1977 | Saito | 360/132 |
|---|---|---|---|
| 4,419,708 | 12/1983 | Ogiro et al. | 360/132 |
| 4,560,117 | 12/1985 | Shimizu | 242/345 |
| 4,672,498 | 6/1987 | Harada | 242/347 |
| 4,681,280 | 7/1987 | Duurland et al. | 242/345.2 |
| 4,703,384 | 10/1987 | Kawada et al. | 360/132 |
| 4,716,745 | 1/1988 | Hehn | 70/58 |
| 4,743,984 | 5/1988 | Ryan | 360/132 |
| 4,765,563 | 8/1988 | Satoyoshi et al. | 242/345 |
| 4,814,923 | 3/1989 | Kawada et al. | 360/132 |
| 4,831,482 | 5/1989 | Sato | 360/132 |
| 4,840,326 | 6/1989 | Katagiri et al. | 242/345 |
| 4,926,279 | 5/1990 | Kurashina et al. | 360/132 |
| 5,088,656 | 2/1992 | Yamamoto et al. | 242/347 |
| 5,181,153 | 1/1993 | Nishimura | 242/345.2 |
| 5,330,128 | 7/1994 | Li et al. | 360/132 |

FOREIGN PATENT DOCUMENTS

| 0090573A1 | 10/1983 | European Pat. Off. . |
|---|---|---|
| 0139181A1 | 5/1985 | European Pat. Off. . |
| 0150987A1 | 8/1985 | European Pat. Off. . |
| 0152693A1 | 8/1985 | European Pat. Off. . |
| 0153585 | 9/1985 | European Pat. Off. . |
| 0189989A3 | 8/1986 | European Pat. Off. . |
| 0344901A2 | 12/1989 | European Pat. Off. . |
| 0384786 | 8/1990 | European Pat. Off. . |
| 2537762A1 | 6/1984 | France . |
| 2568398A1 | 1/1986 | France . |
| 2640071A1 | 6/1990 | France . |
| 59-203285 | 11/1984 | Japan | 360/132 |
| 60-202582 | 10/1985 | Japan | 360/132 |
| 0-194787 | 12/1985 | Japan . |
| 62-28988 | 2/1987 | Japan | 360/132 |
| 2016415 | 9/1979 | United Kingdom . |
| 2016413 | 9/1979 | United Kingdom . |

OTHER PUBLICATIONS

Patent Abstracts Of Japan, JP 61–233484, vol. 11, No. 72 (P–554), Mar. 5, 1987.
Patent Abstracts Of Japan, JP 62–028988, (P–593), Jul. 7, 1987.

*Primary Examiner*—Craig A. Renner
*Attorney, Agent, or Firm*—Watson Cole Stevens Davis, P.L.L.C.

[57] ABSTRACT

A tape cassette for a recording/reproducing apparatus comprises a cassette casing comprising an upper half and a lower half, a front cover provided to cover a front opening portion of the cassette casing for protecting a magnetic tape and for opening and closing the front opening portion and a locking member provided on at least one of right and left side surfaces of the cassette casing to lock the front cover when it is closed. A gap is formed between an outer side surface of the cassette casing and an inner side surface of the front cover so as to permit insertion of a member which serves to release the locking member from being locked. A projection is formed on an inner surface of the front cover covering the gap.

5 Claims, 23 Drawing Sheets

TAPE CASSETTE HAVING RIBS FOR REGULATING AXIAL MOVEMENT OF THE TAPE REELS

This is a division of application Ser. No. 08/235,234 filed Apr. 29, 1994, now U.S. Pat. No. 5,475,555, issued Dec. 12, 1995 which is a continuation of Ser. No. 07/795,965 filed Nov. 21, 1991, now abandoned.

BACKGROUND OF THE INVENTION

This invention relates to a tape cassette which is most suitable for use in a recording/reproducing apparatus such as a video tape recorder or other information processing apparatus, and more particularly, to a tape cassette which has a front cover rotatably attached in the front of a cassette casing to protect the surface of a magnetic tape and a rear cover pivotally supported by the front cover so as to be moved in cooperation therewith and serving to cover the back of the magnetic tape with the opening and closing operations of the front cover. In this tape cassette, vertically movable plugs are inserted in through holes formed in the cassette casing so that, when the positions of these plugs are changed arbitrarily, an information detecting sensor provided in the video tape recorder is made to detect the positions of the plugs thus changed, thereby making it possible to confirm various cassette information such as the prevention of miserasing.

In this kind of tape cassette, in order to protect a magnetic tape stretched on the front side of the cassette main body, the magnetic tape is held between the front cover and the rear cover provided rotatably and openably in the front of the cassette main body. (See Japanese Utility Model Unexamined publication No. 60-194787, for example.)

A conventional tape cassette of the above-described type will be described below with reference to the drawings. Heretofore, this type of tape cassette has been constructed as shown in FIGS. 1 to 8.

In FIGS. 1, 2, 3 and 4, a tape cassette comprises a front cover 7, an upper half 1 and a lower half 2, in which tape cassette a pair of tape reels 3 (S side) and 4 (T side) on which a magnetic tape 5 is wound are encased. The front cover 7 has a substantially U-shaped form in cross section, and a pair of first fulcrum pins 7b are formed integrally on the insides of right and left lugs 7a extending from opposite ends of the front cover 7 and facing in parallel with each other, the fulcrum pins 7b extending inwardly while being coaxial with each other.

As shown in FIG. 2, the front cover 7 has a pair of brackets 7h formed on the inside of the top and located at positions close to the center thereof. A pair of pin holes 7s are formed in the lower portions of the brackets so as to be substantially coaxial with each other. A pair of support pins 8a provided at right and left opposite ends of a rear cover 8 are to be inserted into the pair of pin holes 7s, respectively, so as to make the rear cover 8 rotatable about the support pins 8a.

As shown in FIGS. 2 and 5, the opposite fulcrum pins 7b of the front cover 7 formed as described above are respectively brought into engagement with a pair of pin engaging holes 2i, 1f which are formed in right and left opposite side walls 2f, 1e of a cassette casing 6. A pair of second pins 8b are formed at right and left opposite ends of the rear cover 8 so as to be integral therewith and substantially coaxial with each other and are brought into engagement with guide grooves 11 for free sliding movement in the vertical direction. It is therefore possible to close/open the front and rear covers substantially simultaneously with respect to the magnetic tape 5 stretched on the front side of the cassette casing 6 with the rotary motion of the front cover.

Further, as shown in FIGS. 2 and 5, the front cover 7 is rotatably attached to the cassette casing by bringing the opposite first fulcrum pins 7b thereof into engagement with the pair of pin engaging holes 2i, 1f formed in the right and left side walls 2f, 1e of the casing so that it can rotate in directions a and a' through about 90° between two positions where the cover is opened and closed as shown in FIG. 3, thereby serving to open and close a front opening of the cassette casing. As shown in FIG. 4, there is provided a gap 16 between the inside of one of the end lugs 7a of the front cover 7 and the side wall 2f of the cassette casing which faces on the lug concerned, and the front cover 7 is urged to rotate in the direction of closing the cover by means of a torsion coiled spring 10 fitted on the first fulcrum pin 7b. The torsion coiled spring 10 is engaged at one end 10b thereof with a spring stopper 7e projecting from the inside of one end 7a of the front cover 7 at a position in front of the first fulcrum pin 7b and at the other end 10a thereof with another spring stopper 1d formed integrally with another side wall 1a of the cassette casing located rearwards of the first fulcrum pin 7b.

Referring to FIGS. 2 and 3, following the opening and closing operations of the front cover 7 (bracket portions 7h), the rear cover 8 moves rotatively about the support shafts 8a while other support shafts 8b of the rear cover 8 are fitted and inserted into the guide grooves 11 formed in the lower half 2, and therefore, it is possible to forcibly open and close the cover at the rear of the magnetic tape. Namely, the support shafts 8b serve as the control shafts when the rear cover 8 is opened and closed.

Further, since the rear cover 8 is required to move smoothly when opened and closed, it becomes necessary to provide a proper play (clearance; not shown) between the guide groove 11 of the lower half 2 and the opening and closing control shaft 8b. However, too much play will result in the deterioration of the sealing performance between the rear cover 8 and the front cover 7, thereby to exert bad influence on the information recorded and stored on the magnetic tape due to dust and the like from the outside. Particularly when the cassette is turned upside down, there is a tendency to cause a space between the front cover 7 and the rear cover 8 attributable to the individual weight of the rear cover 8 itself, the size of the space being equivalent to the play.

A biasing coiled spring 12 is supported on the rotation support shaft 8a of the rear cover 8 with one end thereof pressed against the bracket 7h of the front cover 7 and the other end thereof pressed against the vicinity of the rotation control shaft 8b, and a play suitable for smooth rotation is provided between the movement control shaft 8b and the guide groove 11 as described above, and, at the same time, the rear cover 8 is applied with the biasing force to close the cover at all times. With the above construction, even if the tape cassette is used harshly, the sealing performance between the front cover 7 and the rear cover 8 is improved so that the information recorded and stored on the magnetic tape can be protected.

In FIG. 5, in the space of a gap 47 defined by projection 2h at the rear of the first fulcrum pin 7b at one end (lug) 7a of the front cover 7, a locking member 9 is rotatably attached. The locking member 9 is formed integrally with a pivot shaft 9a (second fulcrum) at its top end, a locking pawl 9k at its lower front and a lock releasing protrusion 9h at its rear bottom end. The pivot shaft 9a is brought into engagement with pin engaging holes 2g formed in the cassette casing so that the locking member 9 is made rotatable back and forth. Further, the locking member 9 is urged to rotate forwardly at all times by means of a spring 13. A shown in FIG. 6, in a state where the front cover 7 is closed, the locking pawl 9k of the locking member 9 is brought into engagement with a protrusion 7d, which is formed integrally with the lug 7a of the front cover 7 so as to project inwardly at a lower end position $P_2$ located in rear of the first fulcrum shaft 7b, from behind and below, thereby locking the front cover in the nearly closed condition.

In FIG. 5, each of the engaging holes with which the first fulcrum pins 7b of the front cover 7 are brought into engagement consists of the substantially semicircular holes 1f and 2i formed in the vertical combining portions of the right and left opposite side walls 1e and 2f of the upper and lower halves 1 and 2. The engaging holes 2g with which the pivot shaft 9a of the locking member 9 is brought into engagement are formed in the substantially U-shaped locking member receiving wall portion provided in rear of the front cover 7 and formed at the upper end of one or both of the side walls of the lower half 2 so as to have a top-opened U-shaped form. By fastening together the upper and lower halves 1 and 2 with screws or the like with both first fulcrum pins 7b of the front cover 8 kept in engagement with the holes consisting of the upper and lower semicircular holes and with the right and left opposite ends of the pivot shaft (second fulcrum) 9a of the locking member 9 kept in engagement with the pin engaging holes, the front cover 7 and the locking member 9 can be rotatably attached separately without any possibility of their coming off.

As the tape cassette having the above construction is loaded into the VTR (not shown), a lock releasing member 14 which can project from the VTR side is made to come in contact with the lock releasing protrusion 9h (9j) of the locking member 9 as shown in FIG. 6, so that the locking member 9 is moved back rotatively about the pivot shaft 9a and the locking pawl 9k is disengaged from the protrusion 7d of the front cover to release the locked condition. Then, a cover opening member (not shown) formed on the VTR side is inserted into a space 16 defined between the front cover 7 and the cassette casing side wall stepped surfaces 1e, 2f so as to push up an end face 7p of the front cover 7 against the biasing torsion coiled spring 10 and, at substantially the same time, the bracket 7h formed integrally with the front cover 7 is rotated about the first fulcrum pin 7b and, further, the pushing force is transmitted to the support pin 8a of the rear cover 8 which is supported by the bracket 7h at all times. In this case, contrary to the cover closing operation, the rotation control pin 8b of the rear cover 8 is moved toward the upper part of the cassette within the guide groove 11 of the lower half 2 against the biasing force of the torsion coiled spring 12, so that the rear cover 8 which has been served to protect the back of the magnetic tape is separated therefrom and the front cover 7 is separated from the surface of the magnetic tape. In this way, the covers are removed to open an opening L, thereby competing the loading of the magnetic tape in the VTR.

Next, description will be given of the construction for the judgement of various types of cassette information such as the prevention of miserasing in this kind of conventional tape cassette, that is, the construction in which the cassette is formed with through holes at plural points thereof and in which vertically movable plugs are disposed in these through holes so that positions of the plugs can be changed as desired, by referring to the drawings.

Referring to FIGS. 9 and 13, the cassette casing 6 consists of the upper and lower halves 1 and 2, and the reels 3 and 4 on which the magnetic tape 5 is wound are rotatably encased in the cassette casing 6. The front cover 7 is rotatably attached to the front end portion of the cassette casing 6, and the rear cover 8 capable of being opened and closed following the rotation of the front cover is further attached thereto. In addition, the cassette casing 6 is formed with three vertical through holes 20' (21', 20") at points located on right and left of the front part thereof and at a point located at the center of the rear part thereof. The through holes 20', 21', 20" formed on the back side of the cassette at the points located on right and left of the front part thereof serve as reference holes for positioning when the cassette casing is to be loaded in the recording/reproducing apparatus such as the video tape recorder. Within these through holes 20' (21'), plugs 28' are inserted respectively, and within through hole 20", plug 28" is inserted.

Referring next to FIGS. 10a and 10b, each plug 28' is formed at tis upper end with a tool insert groove 28b' and at its lower end with a protrusion 28d' which projects in the horizontal direction, and two upper and lower stepped portions 24' and 25' are formed in the through hole at different angular positions. The plug is to be inserted in the through hole while being urged by a spring so as to bring the horizontal protrusion at the lower end of the plug into engagement with either of the two upper and lower stepped portions 24' and 25'. By so doing, the vertical position of the plug in the through hole can be changed.

Referring to FIGS. 13, 10A and 10B, cylindrical projecting portions 18', 18" and 19', 19" are formed in the upper and lower halves 1' and 2', respectively, so as to meet at surface 29' form the through holes 20', 20", the surfaces 24' and 25' for restricting the vertical movement of the plug 28' (slit-like upper and lower positioning portions, the vertical and angular positions of which differ from each other in the through hole), and, further, the positioning and sensor insertion holes 21' when the cassette is to be loaded in the VTR.

The plug 28' is formed in the top end part thereof which a crown portion 28a' and the tool insert groove 28b' which can be handled from the outside by means of a screw-driver 42' or the like, and a coiled spring 40' serving to apply an elastic biasing force is disposed around the cylinder part located between the crown portion 28a' and the lower end protrusion 28d'.

The through hole 20' serves both as the insertion hole through which the crown portion 28a' of the plug is to be moved elastically and as the rotative operation range of the top end of the screw-driver.

Referring to FIGS. 10A to 12B, when it is intended to move within the cassette casing 6 the plug 28' which has the elastic coiled spring 40' disposed between the crown portion 28a' and the lower end protrusion 28d', the tip end of the screw-driver 42' is brought into engagement with the groove 28b' formed in the crown portion 28a' of the plug 28' from the outside so as to press down the plug 28' until the lower end protrusion 28d' of the plug 28' is engaged with and inserted into the insertion groove formed in the upper half 1 and goes downwards in the vertical direction beyond the lower surface of the cassette casing 6 against the elastic soiled spring 40' as shown in FIG. 11. In this state, the plug 28' is rotated about the axis thereof in the direction of R' through 180° so as to fix the position of the lower end protrusion 28d' at the point where either of the slit-like positioning portions 24' and 25' is formed in the cassette casing 6 due to the elastic restoring force of the coiled spring 40'. In this way, the vertical position of the plug 28' can be changed within the through hole 21'.

On the other hand, a position detective sensor pin 41' is formed upright on the VTR apparatus for free vertical movement for transferring a signal to the VTR apparatus according to the vertical position at which the position detective sensor 41' comes in contact with the lower end portrusion 28d' of the plug 28' and, further, with a lower end surface 28e', so as to prevent the re-recording of information or the miserasing of the information recorded already on the magnetic tape.

FIG. 11 shows the operation for moving the plug 28' from the upper position 25' to the lower position 24'. Namely, in the state where the tip end of the screw-driver 42' is brought into engagement with the groove 28b' formed in the crown potion 28a' so as to press down the plug 28' until the lower end protrusion 28d' of the plug 28' is engaged with and inserted into the insertion groove formed in the upper half 1 and goes downwards vertically beyond the lower surface of the cassette casing 6 against the elastic coiled spring 40', the plug 28' is rotated in the direction of R' through 180°.

Then, as the plug 28' is moved to the position where the plug lower end portrusion 28d' engages with another vertical groove, the elastic restoring force generated by the coiled spring 40' is transmitted to the plug 28' so that the lower end protrusion 28d' is received in the lower positioning portion 24' as shown in FIGS. 12A and 12B. On the other hand, the operation for moving the lower end protrusion 28d' from the lower positioning portion 24' to the upper positioning portion 25' is reverse to the operation described in connection with FIG. 11, that is, in the state where the lower end protrusion 28d' is pressed down until it goes beyond the lower surface of the cassette casing 6 due to the operation performed from above, the plug 28' is rotated in the direction opposite to the direction of R' through 180° so as to make the lower end protrusion 28d' engage with the other vertical groove likewise. As a result, the lower end protrusion is received in the upper positioning portion 25' due to the elastic restoring force generated by the coiled spring 40.

However, the conventional tape cassette of this kind has the following problem. Namely, as shown in FIGS. 4 and 6, in the conventional tape cassette, it becomes necessary to provide the space 16 and the front cover face 7p for enabling, when the tape cassette is loaded in the VTR, the cover opening member (not shown) formed on the VTR side to open the front cover to the tape cassette after releasing the locked condition by the contact of the locking releasing member 14 with the releasing protrusion 9h (9j) of the locking member as shown in FIG. 6, and hence, it is necessary to provide a gap S between the cassette casing 6 and the front cover 7.

In FIG. 14, the tape cassette (casing 6) which comprises the above-described front cover 7 and the rear cover 8 is provided with the lugs 7a, first stepped surfaces 1e, 2f which are formed in one or both of the side walls of the cassette casing 6 and which have the thickness equal to that of the lug 7a on which the pivot shaft is formed, and tapered second stepped surfaces 1g, 2j which are formed forwardly of the first stepped surfaces 1e, 2f in the cassette casing, so that there can be assured and provided between the front cover lug 7a and the second stepped surfaces 1g, 2j the space 16 through which the front cover opening member formed on the VTR side is made to pass as well as the gap S. On the other hand, the front cover 7 is formed at the lower end thereof with the stepped surface 7p with which the cover opening member is made to come in contact.

As the cassette casing 6 is loaded in the VTR apparatus, the lock releasing member 14 of the VTR is made to come in contact with the lock releasing projection 9h (9j) of the locking member 9 of the tape cassette as shown in FIG. 6, so as to release the lock for preventing the front cover 7 from being opened. Then, as soon as the cassette casing 6 is positioned in the standard position in the VTR in a short time, the front cover opening member (not shown) formed on the VTR side is inserted through the gap S so as to perform the cover opening operation against the biasing torsion provided by biasing torsion coiled spring 10.

In FIG. 14, the front cover opening member formed on the VTR is required to have a proper width from the viewpoint of the strength. Further, in consideration of the scatter in the positional accuracy of attaching, the proper width S of the space 16 becomes necessary. Increase of the width S contributes to the improvement of the chucking reliability of the VTR at the time of opening the cover, but too large a width S interferes with the loading area for tape travelling in the cassette. Accordingly, it is necessary that the width S take a proper value which can satisfy these two conditions.

If an impact load is applied to the corner of the front cover 7 of the above-described tape cassette in the direction of W (when the tape cassette is dropped, for example) as shown in FIG. 14, not only is the lug 7a on which the pivot shaft of the front cover is formed deformed (moved) elastically within the gap S, but also, the corner of the front cover lug 7a is cracked, or the lug 7a is broken at the corner, so that it becomes impossible to open and close the front cover, resulting in the fatal defect of the cassette that the recorded information is lost due to exposure of the surface of the magnetic tape 5 to dust from the outside, fingerprint, moisture, smoke or the like.

Further, if a load is applied to the corner of the front cover 7 in the direction of W so that the lug 7a on which the pivot shaft is formed is deformed elastically within the gap S, if the strength of the corner is high enough to prevent the cracking, the reaction force causes the pivot shaft 7b of the front cover to come off from the cassette casing 6 or to be broken to make it impossible to open and close the front cover itself while the magnetic tape surface is being exposed, resulting in the fatal defect noted above.

Further, if a load is applied to the corner of the front cover in the direction of W so that the lug 7a on which the pivot shaft of the front cover is formed is deformed elastically within the gap S and the front cover corner, the pivot shaft 7b and the engaging holes 1f, 2i of the cassette casing having the impact strength, since the rear cover 8 itself and the movement thereof are held and controlled by a pair of guide shafts 8b between a pair of guide grooves 11 provided in the cassette casing 6 as shown in FIGS. 9 and 14, the impact force is transmitted to the brackets 7h formed on the inside of the front cover 7 for pivotally supporting the rotary shafts 8a of the rear cover, with the result that the brackets 7h are broken so as to cause the rear cover 8 to be disengaged from the tape cassette. If the rear cover 8 is disengaged from the tape cassette, since the tape 5 is damaged and the back of the magnetic tape is exposed, the information recorded and stored is lost as mentioned before, resulting in the fatal defect as well.

The above-described conventional tape cassette further has the following problem. Namely, as shown in FIGS. 15 and 16, from viewpoint of the design of the convention tape cassette, in order to detect the terminal end of the tape reel, holes 7c and 2c through which the photodetective optical path is made to pass and which are formed in the front cover 7 and the cassette casing 6, must be aligned with each other when the front cover is fully opened. The locking protrusion 7d' formed beforehand integrally on the inside of one or both of the lugs 7a at the opposite side ends of the front cover 7 can be released from the cover closing condition after the front cover 7 is permitted to rotate upwards of the cassette casing at the time when the locking member 9 is temporarily rotated backwards of the cassette casing by an external means such as the releasing member 14 of the VTR, for example, as shown in FIG. 6, that is, at the time of releasing the locked condition. In this case, since the locking member 9 is always urged rotatively toward the front of the cassette (or in the direction of locking the cover) about the pivot shaft 9a by means of the spring 10 (13) or the like, if there is exerted no external constraining force to the biasing force Pb, the locking member 9 is allowed to move easily within the movable range as shown in FIG. 15. In consideration of the cumulative moving backlash of the cassette in the VTR and, further, the cumulative attaching backlash of the lock releasing member 14 and the like, it is easily possible to cause the lock releasing member 14 to strike at the air. As shown in FIG. 15, since the optical path 2c along which a ray of light is made to pass when the cover is opened is covered with the locking pawl 9k of the locking member and the vicinity thereof, it is impossible to detect the terminal end of the tape so as to bring about the malfunction. Further, as shown in FIG. 16, in case that the front cover tends to rotate in the cover closing direction due to the biasing force Pf' with the locking member being rotated forwardly of the cassette due to the biasing force Pb' of the spring 10 or the like, the locking protrusion 7d' formed on the inside of the front cover 7a comes into contact with a surface 9e of the locking member so that the front cover and the locking member are restrained unreasonably so as to be brought to a standstill relative to each other. If they are kept in this state, not only can the tape cassette not be ejected out of the VTR, but also, the VTR or the cassette casing may by damaged if ejection by force is tried. In addition, if the locking member 9 is returned to its regular position unexpectedly, the front cover is rotated in the cover closing direction irrespective of the position of the magnetic tape drawn out, with the result that the magnetic tape is damaged to cause the information recorded and stored thereon to be lost. This is a serious defect that can take place whether the cassette casing exists inside or outside of the VTRs.

In the state shown in FIG. 16, if it is tried to push the front cover by force in the cover closing direction, the abutting force between the front cover and the locking member is increased to damage either member, thereby making it impossible to fulfill the prescribed function.

Moreover, the conventional tape cassette of this kind has the following problem. Namely, as shown in FIG. 17, it is necessary in the first place to insert (or temporarily fit) the plug 28' in the cassette upper half 1. In this case, since the vertical insertion groove with which an upper surface 28c' of the plug lower end protrusion 28d' is brought into engagement is not formed in the through hole 20' of the cylindrical projecting portion 18', the plug 28' itself is inclined in the direction X within the range of the plug receiving portion 20' and, further, pressed down against the biasing force 2' produced by the coiled spring 40' until the lower end protrusion 28d' goes beyond the plug lower positioning portion 24' of the upper half 1, that is, the position of greater displacement. For this reason, the operation is very complicated and requires sufficient experience in practice.

Then, the upper and lower halves are to be coupled together and fastened with screw or the like. By so doing, after the plug 28' is moved vertically and rotated about the axis thereof through about 180°, the vertical position of the plug 28' can be changed. However, since the positioning portions 24' and 25' with and by which the plug lower end protrusion 28' is brought into contact and positioned are provided in the upper and lower halves, respectively, with their heights and angular positions being different from each other, the structure of molds becomes complicated and, at the same time, it is difficult to mold these halves, with the result in that the cost is increased and, further, it becomes liable to cause the scattering because the upper and lower positions are constructed by the combination of the upper and lower halves.

In addition, in case of changing the plug itself between the upper and lower positions, since the stroke is so long that the plug lower end protrusion 28d' must be moved down to the lower surface of the cassette casing 6', the elastic reaction force of the spring becomes large naturally with the increase of the stroke, resulting in the operational difficulty as well.

Moreover, since the upper and lower halves are simply joined face to face with each other, if an unexpected high load is applied to the cassette casing 6 due to drop impact or the like, an offset U is caused due to disagreement between the cylindrical projecting portions of the upper and lower halves as shown in FIG. 18, so that the plug 28' assumes an aspect reverse to that assumed when it is temporarily fixed in the upper half. As a result, a spring biasing reaction force is exerted on the plug 28' so that the plug 28' is disengaged upwards from the cassette casing, thereby giving rise to a fatal defect that the prescribed function cannot be fulfilled.

SUMMARY OF THE INVENTION

In view of the above-mentioned problems of the prior arts, the present invention is achieved. Therefore, an object of the invention is to provide a tape cassette which can solve the above-mentioned problems.

According to an aspect of the present invention, there is provided a tape cassette for a recording/reproducing apparatus comprising a cassette casing comprising an upper half and a lower half, a front cover provided to cover a front opening portion of the cassette casing for protecting a magnetic tape and for opening and closing the front opening portion and a locking member provided on at least one of right and left side surfaces of the cassette casing to lock the front cover when it is closed, wherein a gap is formed between an outer side surface of the cassette casing and an inner side surface of the front cover so as to permit insertion of a member which serves to release the locking member from being locked, and a projection is formed on an inner surface of the front cover covering the gap.

DESCRIPTION OF THE PREFERRED EMBODIMENTS

Figure 1:
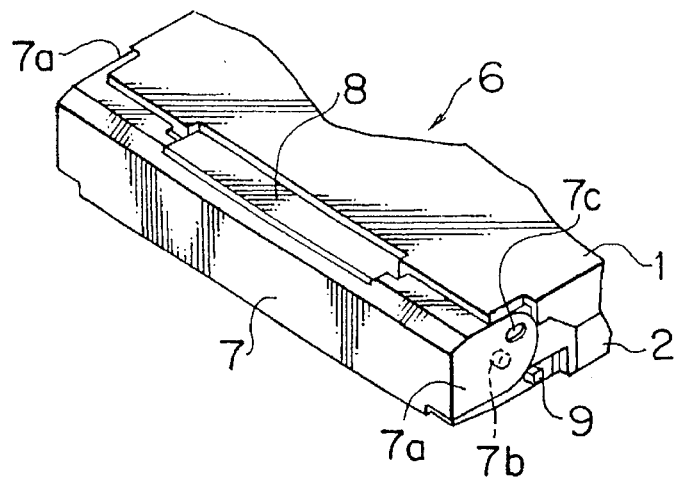
FIG. 1 is an assembly perspective view of a first conventional tape cassette, showing essential portions of component parts thereof.
Figure 2:
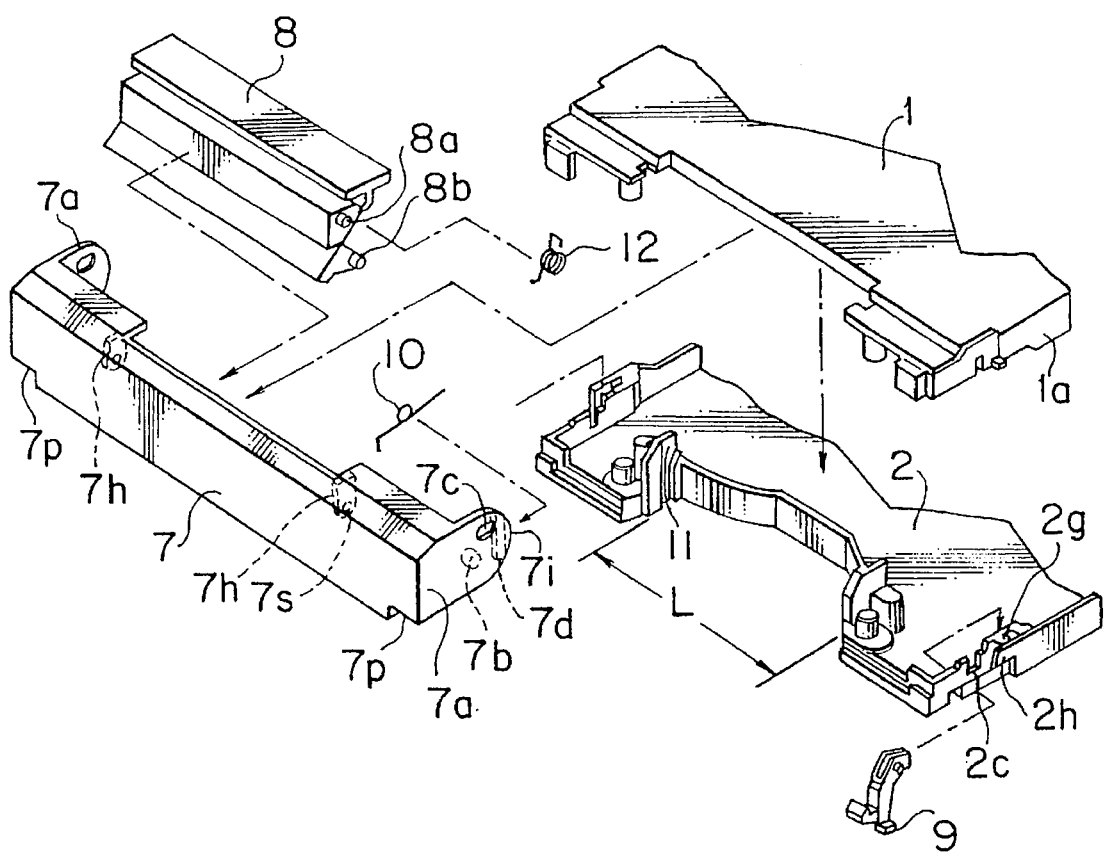
FIG. 2 is a disassembled perspective view of the same tape cassette, showing essential portions of the construction thereof.
Figure 3:
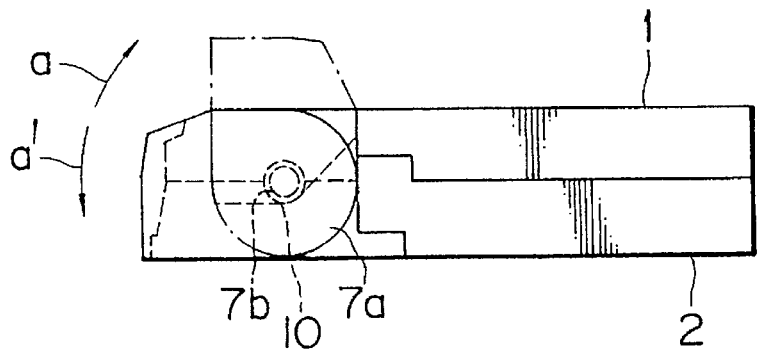
FIG. 3 is a side view of the same tape cassette, showing a front cover in its closed and opened positions.
Figure 4:
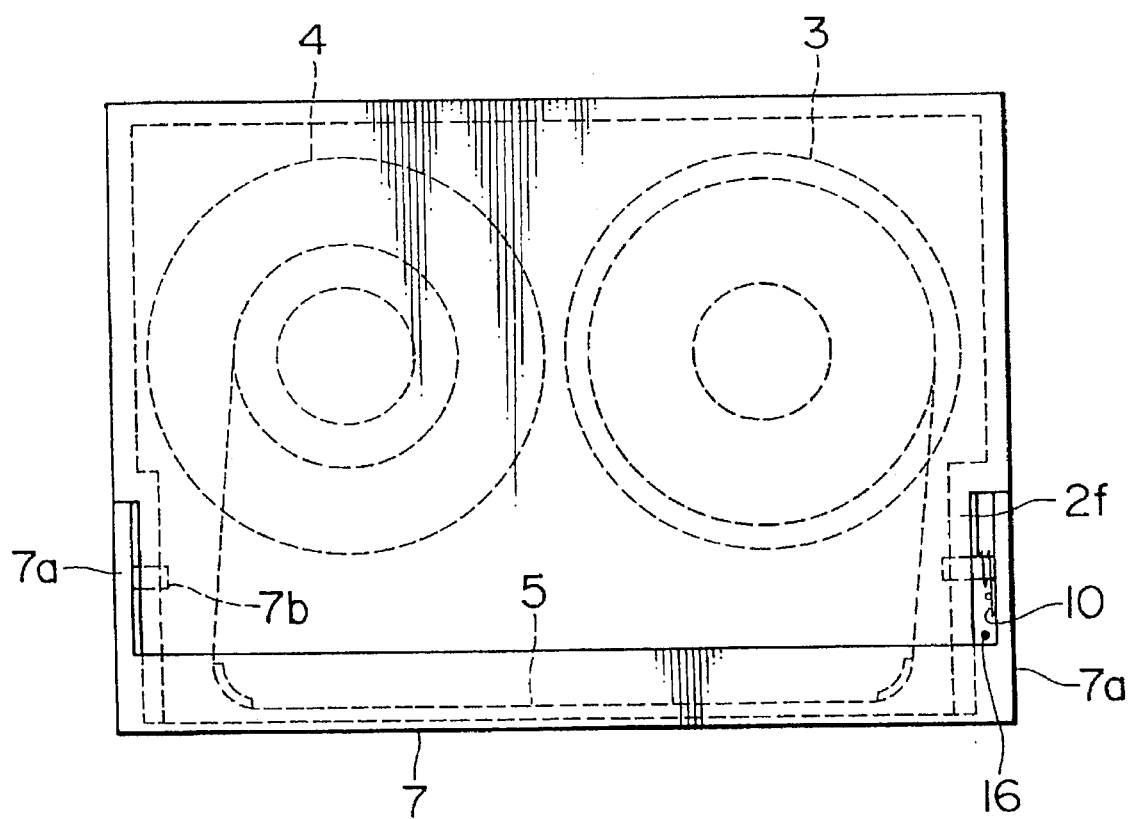
FIG. 4 is a plan view showing the construction of the same conventional tape cassette.
Figure 5:
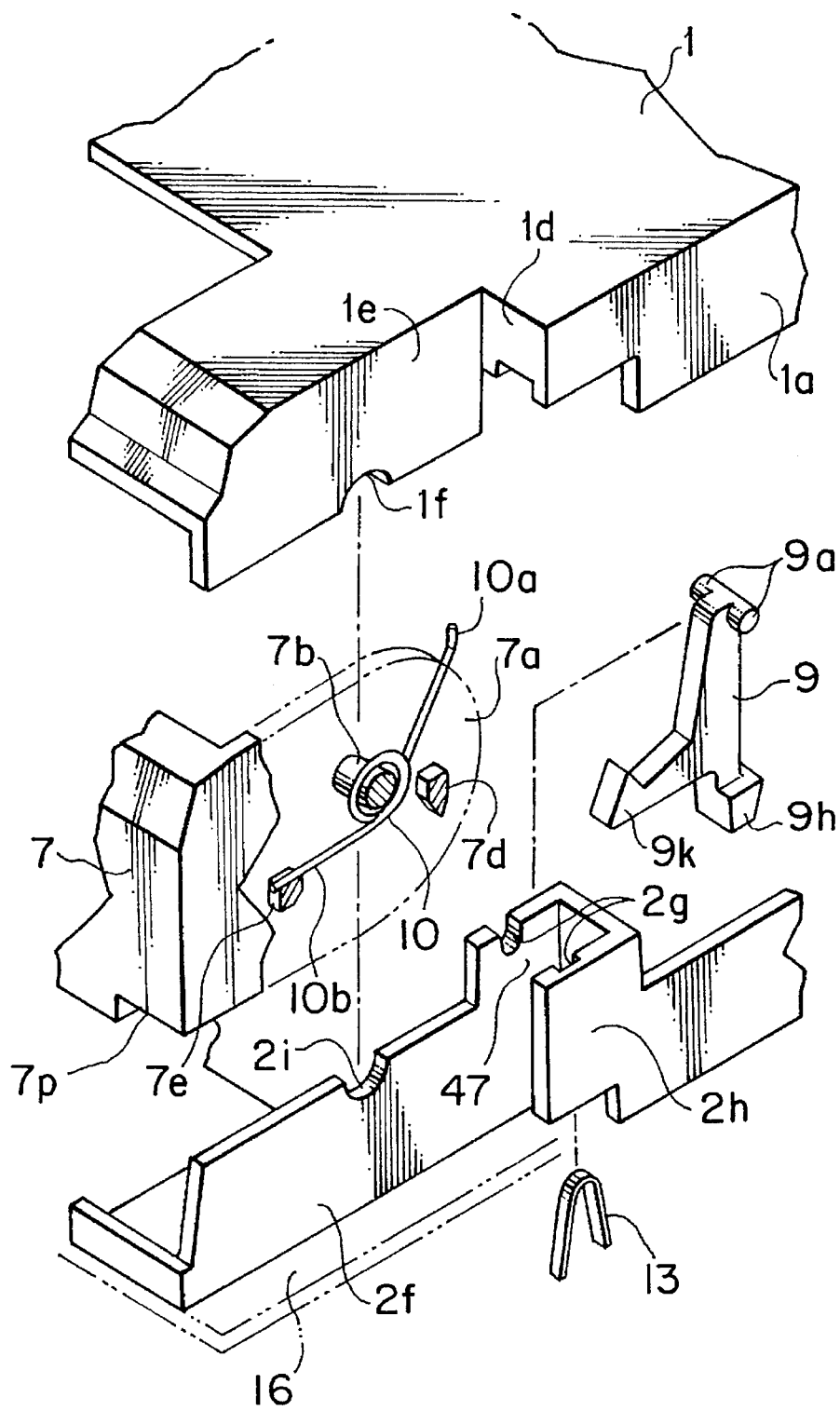
FIG. 5 is a disassembled perspective view of the conventional tape cassette, showing essential portions of the construction thereof.
Figure 6:
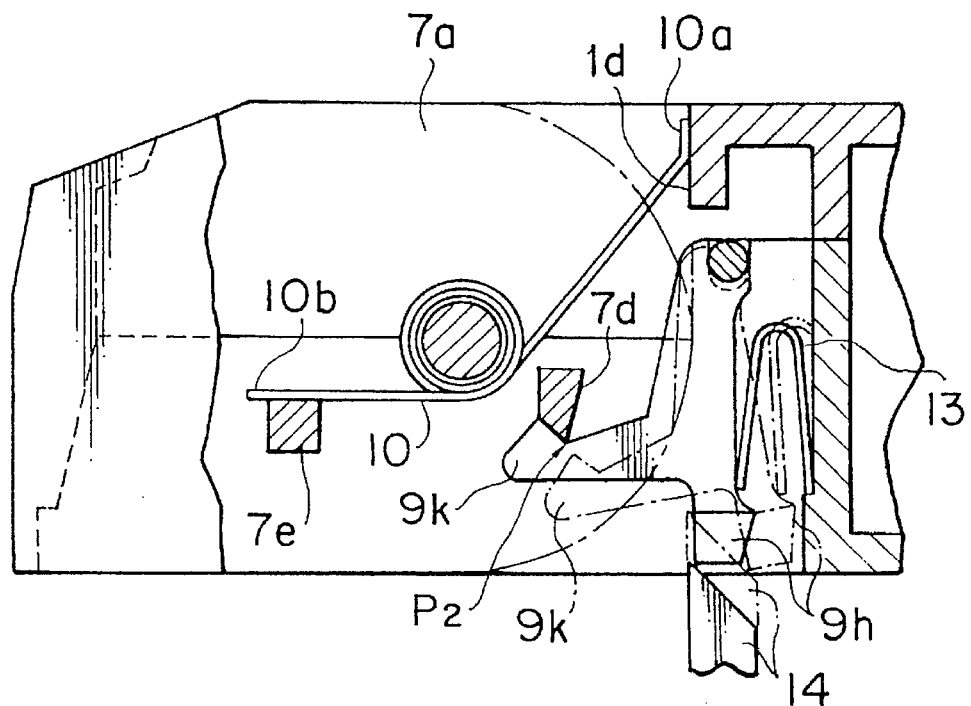
FIG. 6 is a sectional assembly view of the conventional tape cassette, showing essential portions of component parts thereof when a locking member is in the engaged state.
Figure 7:
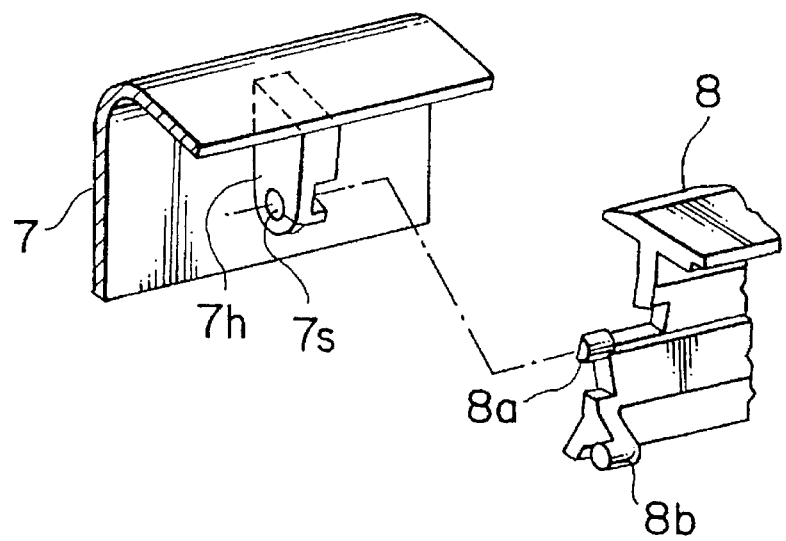
FIG. 7 is a detailed (sectional) view showing the assembly and fitting of the component parts of the same conventional tape cassette when a detection plug is half in its upper position.

Description will be given below of a tape cassette for video tape recorder according to an embodiment of the present invention with reference to the drawings. The general structure of the tape cassette of this embodiment is partially identical with that of the conventional tape cassette shown in FIGS. 1, 2 and 5. In this embodiment, essential portions will be described with the same component parts as those of the conventional tape cassette being designated by the same reference numerals and explanation thereof being omitted.

In the tape cassette of this invention, as shown in FIGS. 19, 20, 21 and 22, a pair of pivot shafts 7b (having heads 7r) of a front cover 7 are brought into engagement with engaging holes 1f, 2i formed in the cassette casing 6 and a coiled spring 10 is used to close the front cover 7. A pair of brackets 7h provided on the inside of the front cover 7 are each formed with pivot holes 7s into which a pair of support pins 8a of a rear cover 8 are inserted respectively so as to make the rear cover 8 rotatable about the support pins 8a. A pair of second support pins 8b are provided in the lower portions of opposite ends of the rear cover 8 so as to be brought into engagement with guide grooves 11 of the cassette casing 6, thereby permitting the rear cover 8 to be closed from behind the back of the magnetic tape. In this way, both sides of the magnetic tape 5 can be protected as the tape travels through a path defined at least in part by posts 50 and portion 4s of reel 4. One or both of the lugs 7a of the front cover 7 are formed with a plurality of projections 15A or 15B, accommodated by indentation 2e, on the inside surface thereof on which the pivot shaft is formed, so as to secure a sphere S into which a cover opening member provided on the VTR is to be inserted as well as to restrict the moving distance of the front cover 7 in the longitudinal direction thereof within the range of a gap T defined between the plural projections 15A or 15B and the cassette casing 6.

Figure 14:
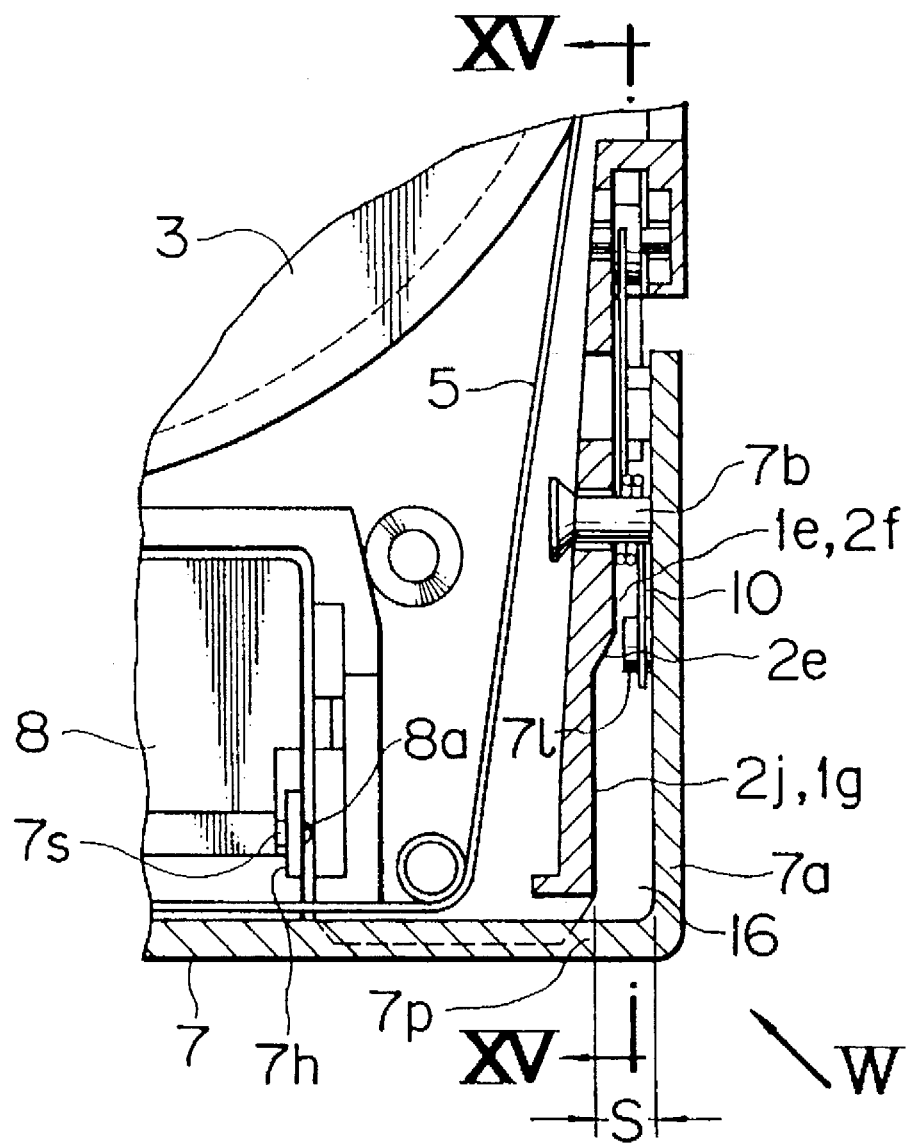
FIG. 14 is an assembly sectional view showing essential portions of the component parts (of the conventional tape cassette) concerned with the first subject.

On the other hand, as shown in FIGS. 21 and 22A–22C, an L-shaped rib 15C is formed integrally with the front cover 7 so as to extend from the inside of the lug 7a to a magnetic tape protective surface 7u, and the gap T is provided between the L-shaped rib and the cassette casing 6 as mentioned before. The L-shaped rib 15C is installed among three surfaces including the pivot shaft forming surface 7a, the tape protective surface 7u and a front cover top surface 7v so as to increase the stiffness to an impact load to be applied in the direction of W (shown in FIG. 14), restrict the displacement within the range of T, absorb and lessen the impact due to the rib effect, and prevent the front cover 7 and the rear cover 8 from being damaged and cracked while protecting the magnetic tape 5 perfectly, thereby giving rise to no fatal defect such as loss of the information recorded and stored on the magnetic tape 5. Also, one of lugs 7a has protrusion 7d integrally formed with projection 7i which has rear surface 7w.

Figure 8:
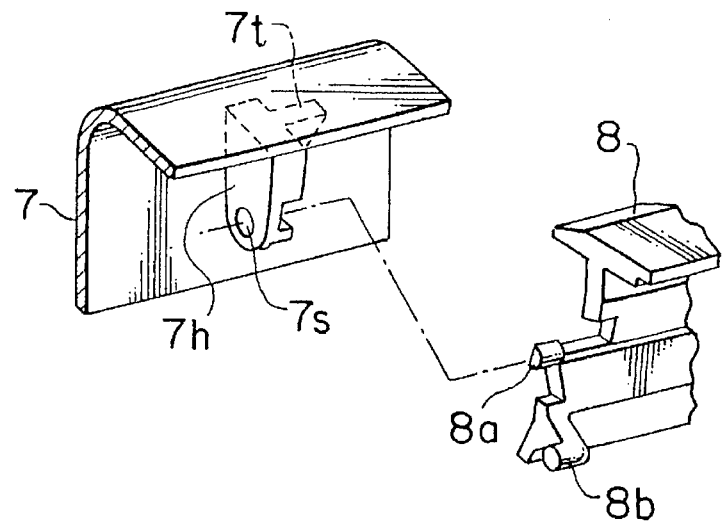
FIG. 8 is a detailed (sectional) view showing the assembly and fitting of the component parts of the same conventional tape cassette when the detection plug is being operated.
Figure 9:
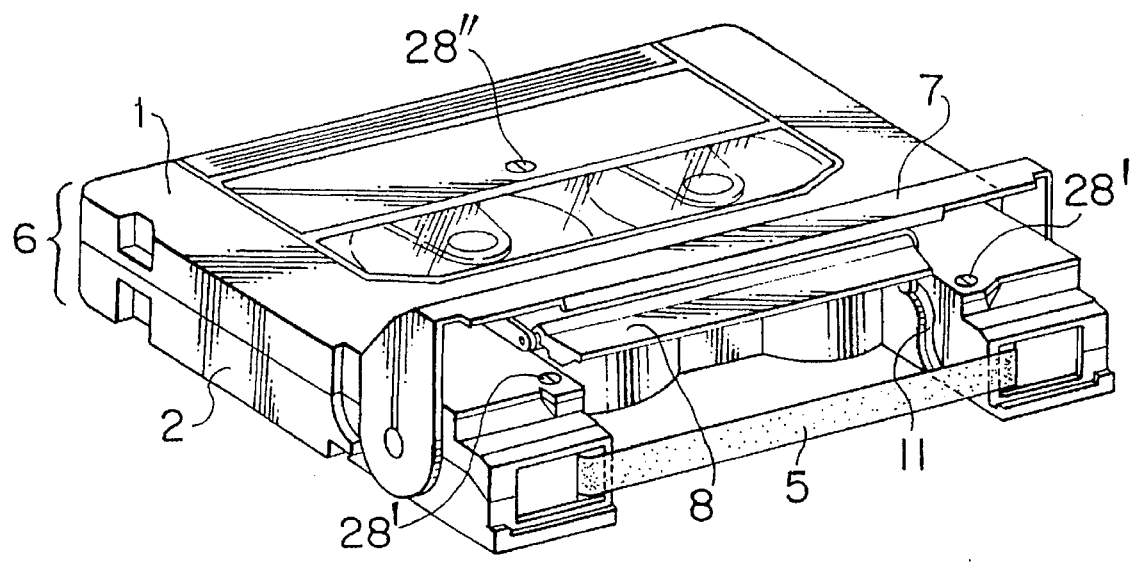
FIG. 9 is an assembly perspective view of a second conventional tape cassette.
Figure 10A:
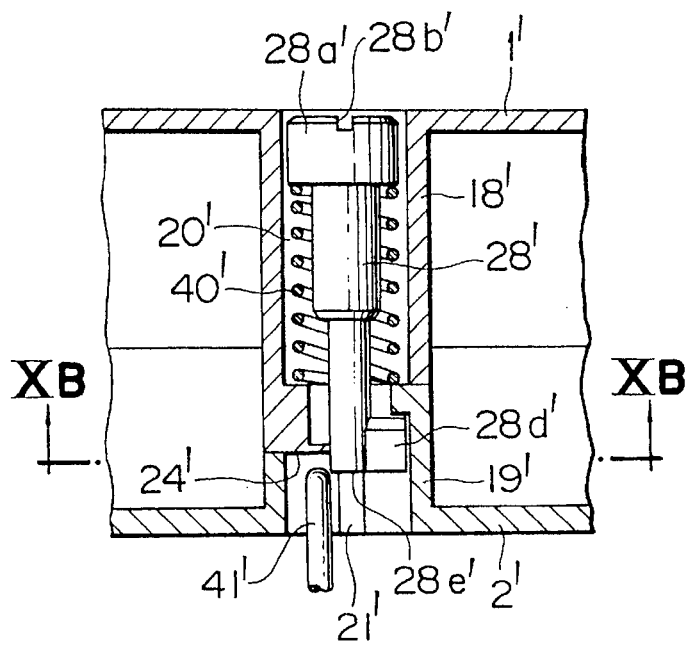
FIG. 10A is a detailed view showing the assembly and fitting of the component parts of the same conventional tape cassette when the detection plug is held in its lower position.
Figure 10B:
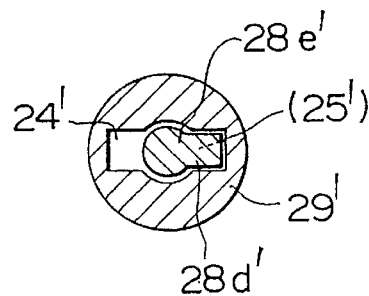
FIG. 10B is an assembly cross-sectional view along line XB—XB of FIG. 10A of the component parts of the same conventional tape cassette when the detection plug is held in its lower position.
Figure 11:
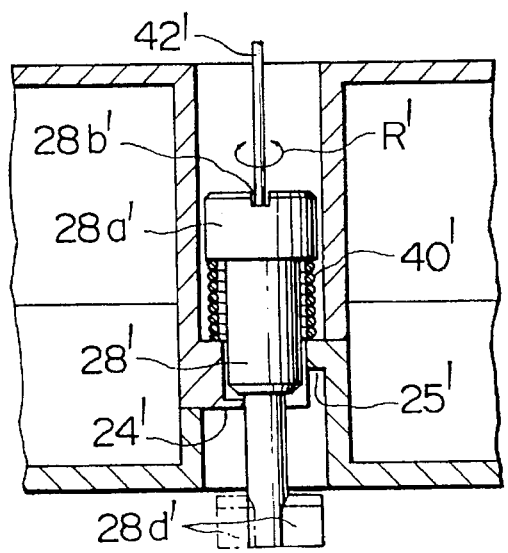
FIG. 11 is a detailed (sectional) view showing the assembly and fitting of the component parts of the same conventional tape cassette when the detection plug is being operated.
Figure 12A:
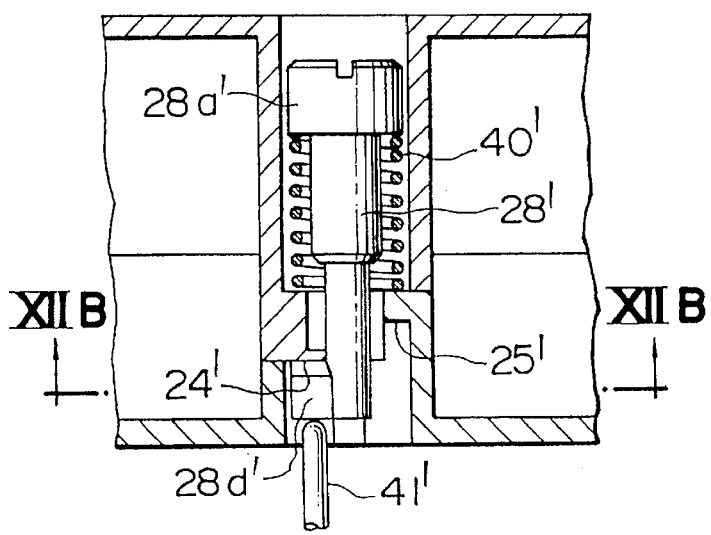
FIG. 12A is a detailed (sectional) view showing the assembly and fitting of the component parts of the same conventional tape cassette when the detection plug is held in its lower position.
Figure 12B:
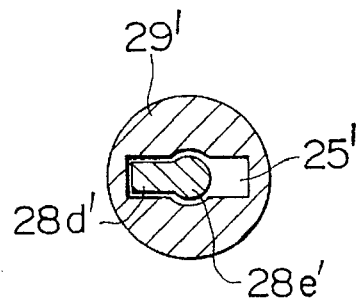
FIG. 12B is a cross-sectional view along line XIIB—XIIB of FIG. 12A showing the assembly and fitting of the component parts of the same conventional tape cassette when the detection plug is held in its lower position.
Figure 13:
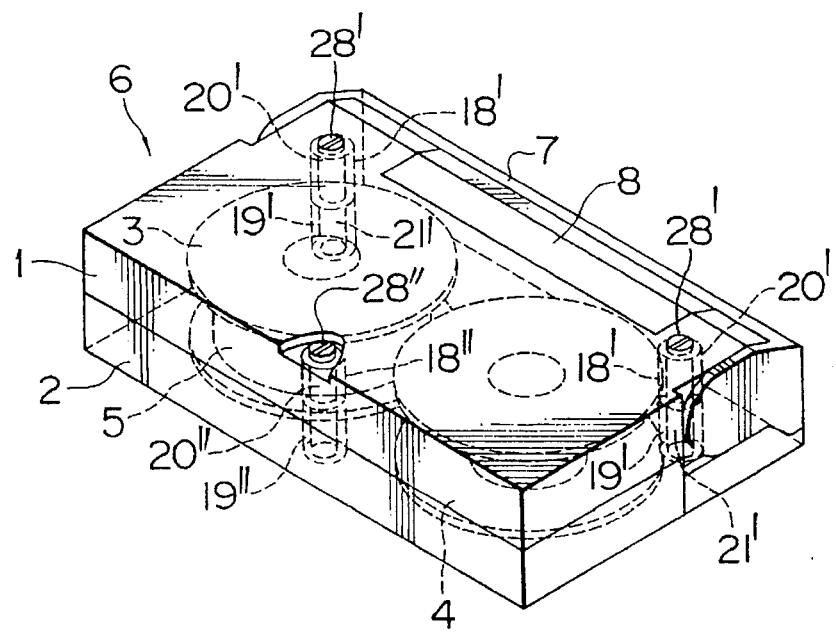
FIG. 13 is an assembly perspective view of the same conventional tape cassette.

Further, it is also effective to increase the stiffness of the bracket 7h by providing a reinforcing rib 7t in the bracket 7h of the front cover 7 as shown in FIG. 8 in connection with the prior art, and however, it is much more effective from the viewpoint of the cassette structure to increase the stiffness by making use of the above technique.

The present invention has been described above in connection with an embodiment, and however, the invention is not limited to this embodiment but can be modified variously and effectively based on the technical idea of this invention.

For example, the plural projections 15A or 15B on the inside of the lug 7a of the front cover 7 may be formed as a single body extending in the thicknesswise direction of the cassette or may be formed as a single body extending in the widthwise direction of the cassette, and, furthermore, the rib is not limited to the L-shaped one but may be a C-shaped one.

The present invention is applicable not only to the tape cassette for use in the video tape recorder but also to tape cassettes for use in various recording/reproducing apparatus which record and reproduce various informations by means of various recording and reproducing methods.

As described above, according to the present invention, the sphere S into which the front cover opening member of the VTR is to be inserted and the space 16 are ensured in the tape cassette so that, even if an impact load is applied to the tape cassette, particularly to the front cover 7 unexpectedly, the displacement of the front cover can be restricted within the range of the gap T provided between the plural projections 15A, 15B, 15C and the cassette casing 6 and the impact force can be absorbed and lessened by the plural projections 15A, 15B, 15C so as to prevent the front cover 7 and the rear cover 8 from being damaged and cracked. In consequence, it is possible to protect perfectly the magnetic tape 5 and the information recorded and stored thereon, thereby giving rise to no fatal defect.

Further, to form the plural projections 15A, 15B integrally on the inside of the lug 7a of the front cover 7 can be realized easily by making use of a die of simple structure, resulting in an extremely reduced cost and unquestionable effect.

Next, a second embodiment of the present invention will be described with reference to the accompanying drawings. The general structure of the tape cassette of this embodiment is partially identical with that of the conventional tape cassette shown in FIGS. 3 to 6, 15 and 16. In this embodiment, essential portions will be described with the same component parts as those of the conventional tape cassette being designated by the same reference numerals and explanation thereof being omitted.

Figure 26A:
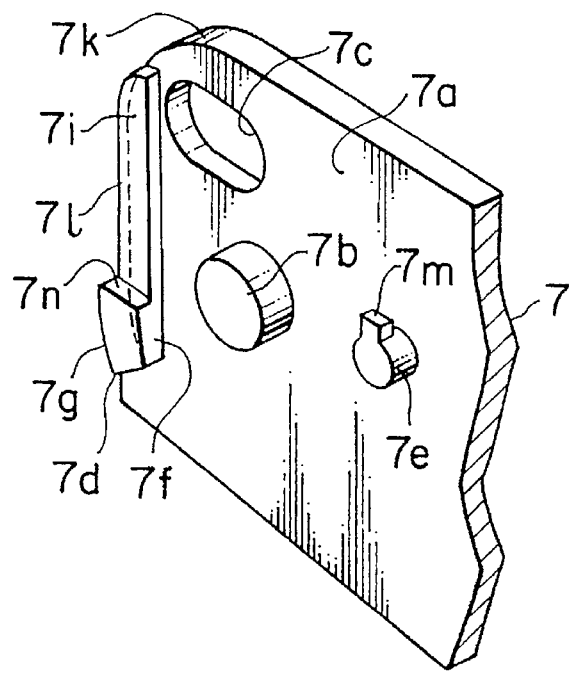
FIG. 26A is a perspective view showing essential portions of the component part (front cover) of the same embodiment of the invention.
Figure 26B:
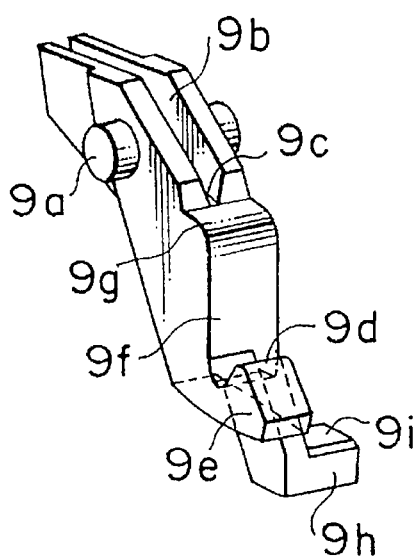
FIG. 26B is a perspective view showing essential portions of the component part (lid lock lever) of the same embodiment of the invention.

IN the tape cassette of the present invention, as shown in FIGS. 26A and 26B, a lug 7a of a U-shaped front cover 7, having an outer surface 7k, is formed integrally with a locking protrusion 7d on the inside thereof, and a flat or stepped straight or tapered surface 7i is further formed contiguously or discontiguously to the locking protrusion 7d to stand in a row, so that the movement of a locking member 9 is controlled due to contact with them from the time just before the cover is closed to the time when the cover is to be opened next. In addition, as a measure for controlling the movement of the locking member, contact surfaces 7l and 7g of the projecting portion of the front cover consists of flat surface portion and curved surface portion and another contact surfaces 9g and 9f of the locking member also consists of flat surface portion and curved surface portion. Upper half 1 has inner surface 1b, and tape 5 is at least partially in contact with portion 17. Spring stopper 7e has projection 7m thereon. Projection 7d has rear surface 7n. Locking member 9 has gap 9c formed therein with inner surface 9b.

Figure 15:
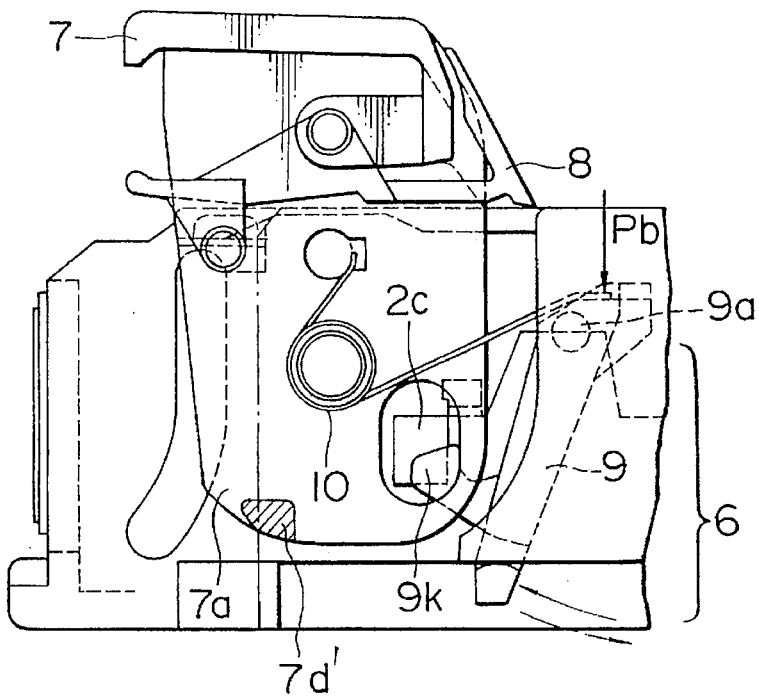
FIG. 15 is an assembly sectional view along line XV—XV of FIG. 14, showing essential portions of the component parts (of the conventional tape cassette) concerned with the second subject (when the locking member gets in deeply)
Figure 16:
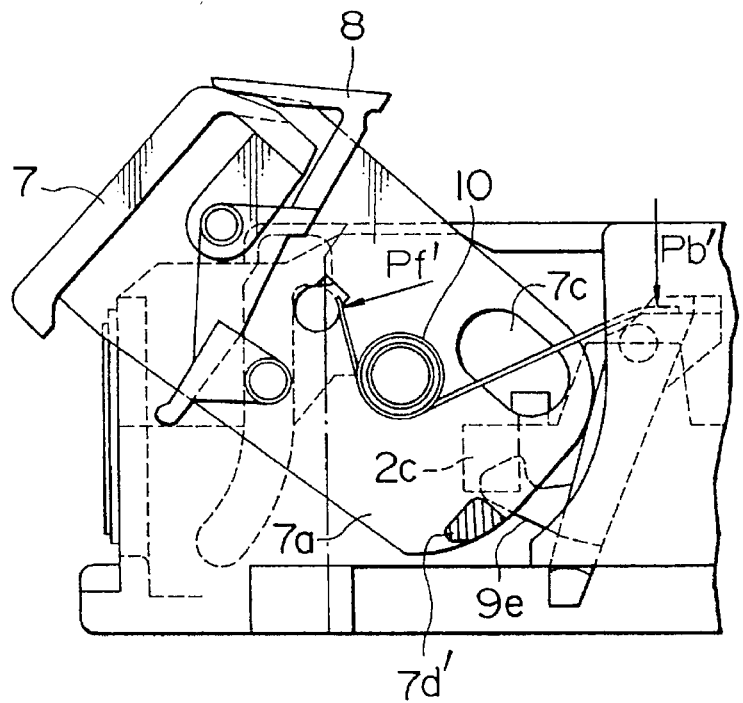
FIG. 16 is an assembly sectional view along line XV–XV of FIG. 14, showing essential portions of the component parts (of the conventional tape cassette) concerned with the same object (when the locking member is brought in the unexpected state)
Figure 17:
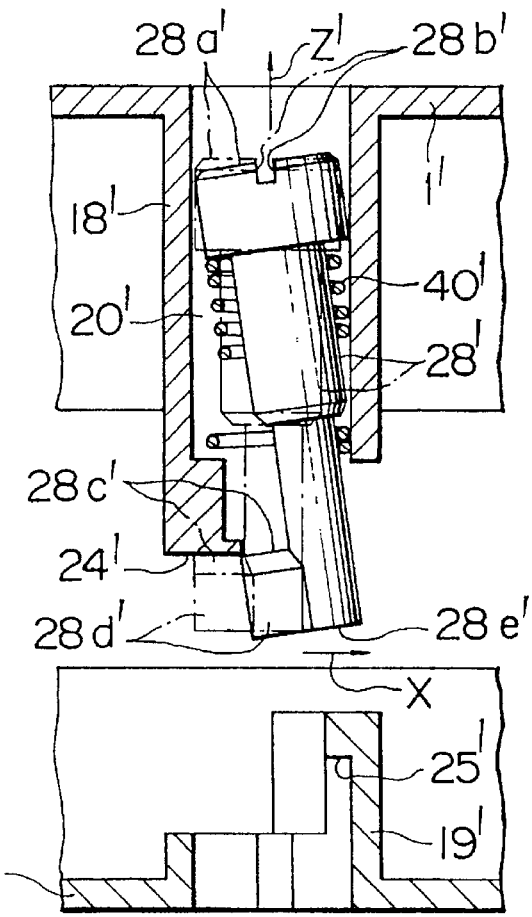
FIG. 17 is a disassembled (sectional) view showing the assembly and fitting of the component parts (of the conventional tape cassette) concerned with a third subject when the detection plug is being inserted.
Figure 24:
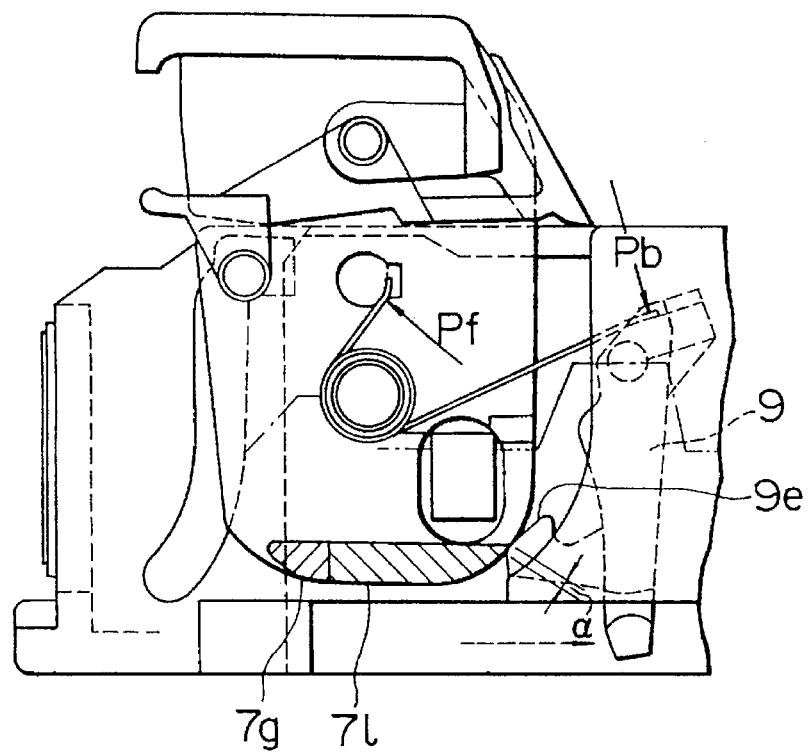
FIG. 24 is an assembly sectional view showing essential portions of the component parts of the second embodiment of the invention (when the front cover is opened)

According to the tape cassette of this invention, even when the front cover is fully opened as shown in FIG. 24, it is hardly caused due to an overlapping area α between the contact engaging surfaces that the locking member 9 gets in too deeply between the front cover and the cassette casing to cover the optical path passing through the hole for detecting the terminal end of the tape wound on the reel as shown in FIGS. 15 and 16 or make the tape cassette inoperative, thereby improving the reliability as for the cassette. Further, the locking member 9 is normally applied with a biasing force Pb by means of a biasing spring 10 toward the front of the cassette casing about the second support pivot, and therefore, the front cover can be locked and unlocked automatically depending upon the state of contact between the engaging surfaces brought about as a result of rotation of the front cover. In this way, the cover can be locked reliably and firmly when it is closed.

Figure 25:
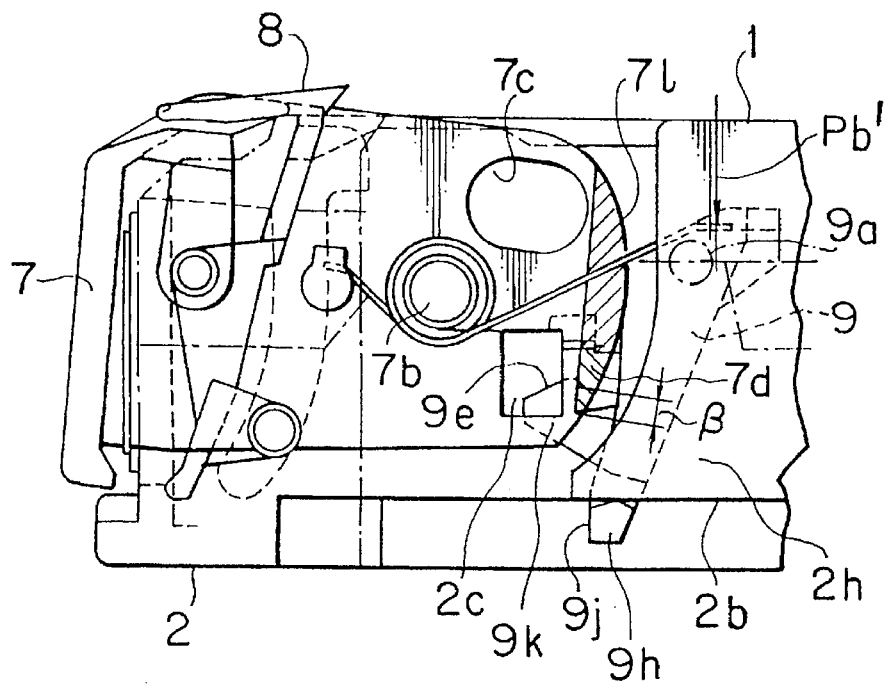
FIG. 25 is an assembly sectional view showing essential portions of the component parts of the same embodiment of the invention (when a locking member is held in the engaged state)

In FIG. 24, the locking member 9 is made to move toward the front of the cassette casing by the action of the biasing force Pb, but, the moving distance thereof is controlled by the contact of one end surface 9e of the locking member releasing projection with the surfaces 7g and 7l formed at opposite ends of the cassette. When it is intended to make the front cover 7 rotate in the cover opening direction in the state shown in FIG. 25, since an engaging area β between the locking protrusion 7d of the front cover and locking pawl 9k of the locking member is increased and since the lock releasing projection 9h is restrained from moving by a surface 2b of a recess 2d of the lower half 2, which contacts surface 9i of projection 9h, the locking force becomes greater than the turning force, thereby perfectly preventing the locking member from being released.

The present invention has been described above in conjunction with an embodiment, and however, the invention is not limited to this embodiment but can be modified variously and effectively based on the technical idea of this invention.

For example, the contact surfaces 7g and 7l formed on the inside of the front cover 7a so as to be brought into contact with the locking member may be formed entirely by a curved surface of a straight surface as well. Further, the engaging surfaces 9d and 7f between the locking projection of the locking member and the locking protrusion of the front cover may be formed at proper angles.

Incidentally, the present invention is applicable to tape cassettes for use in various recording/reproducing apparatus other than the video tape recorder and in other information processing apparatus.

As described before, according to the present invention, the locking member is made to move in contact with the front cover as the front cover is rotated between its closed position and opened position, and, even when the front cover is fully opened, the locking member can be restrained from moving unreasonably due to engagement with the front cover.

Further, since the engaging area between the locking member and the front cover is increased as compared with the turning force of the front cover even when the cover is closed, the front cover can be locked reliably and firmly. The locking and unlocking operations can be performed extremely smoothly and reliably throughout the whole.

Figure 28:
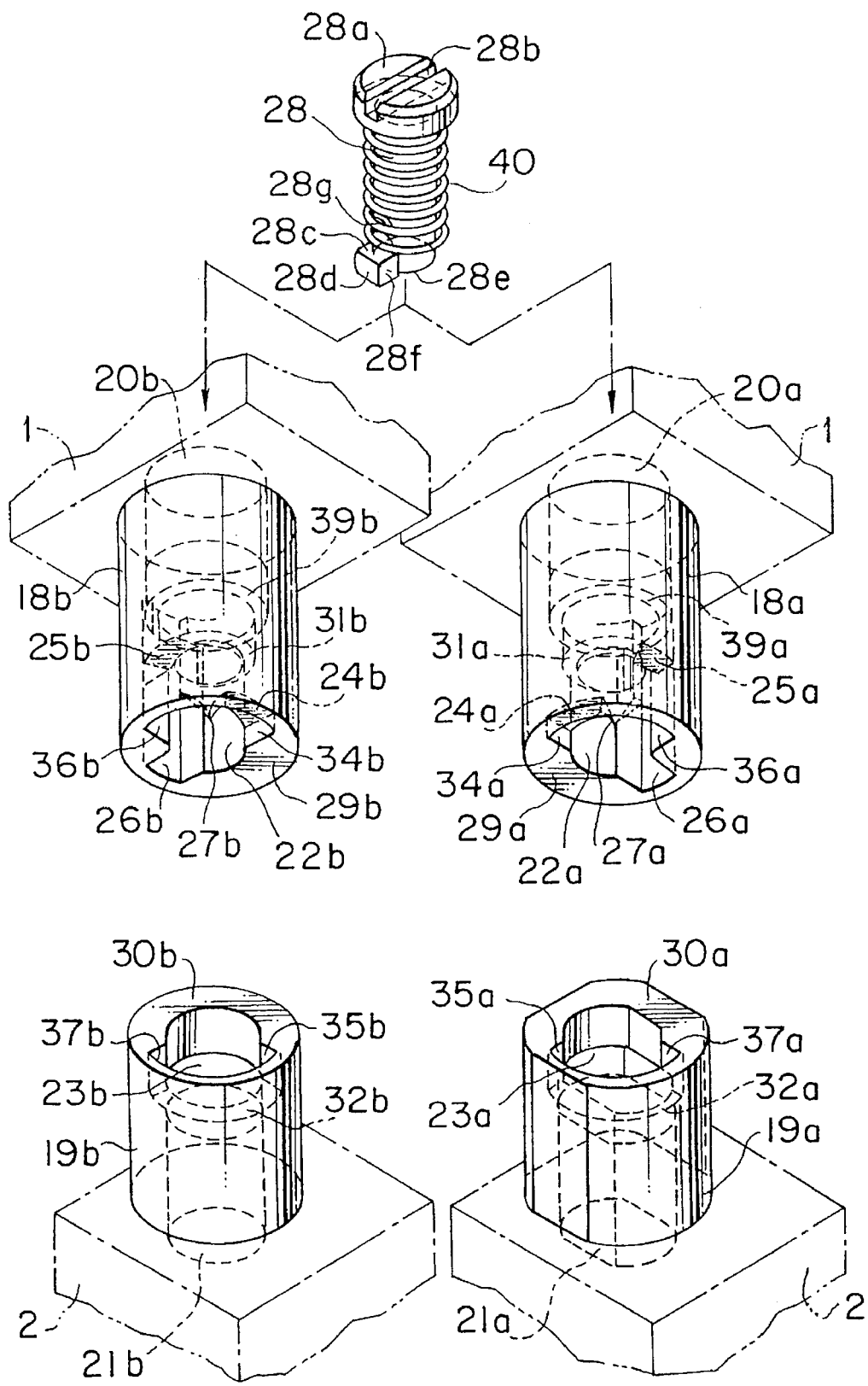
FIG. 28 contains two views one of which is a disassembled perspective view of the first embodiment of the invention showing essential portions of the component parts thereof (on the second standard side) and the other of which is a disassembled perspective view of the first embodiment of the invention showing essential portions of the component parts thereof (on the first standard side)
Figure 29A:
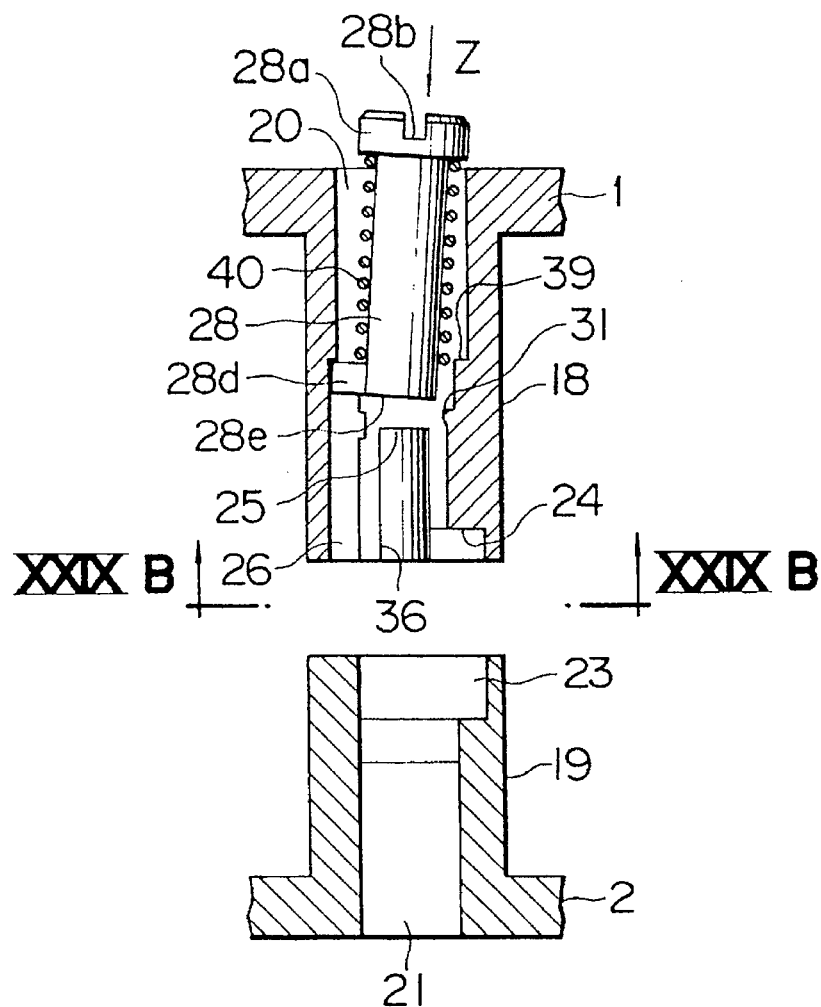
FIG. 29A is a disassembled (sectional) view showing the assembly and fitting of the component parts of the same embodiment when the detection plug is being inserted.
Figure 29B:
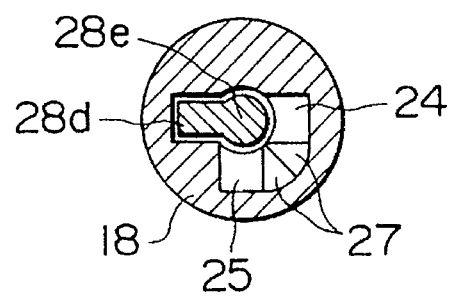
FIG. 29B is an assembly cross-sectional view along line XXIXB—XXIXB of FIG. 29A, of the component parts of the same embodiment when the detection plug is being inserted.

In the tape cassette of the invention, as shown in FIG. 28, each plug consists of a crown portion 28a having a tool insertion groove 28b formed therein, a cylinder portion and a protrusion 28d projecting horizontally from the lower end of the cylinder portion, and a compression coiled spring 40 is fitted on that plug between the crown portion 28a and the lower end protrusion 28d. The plug is formed in the cylinder portion thereof with a concave portion 28g so as to improve the insertability thereof into the coiled spring. The plug is made of a synthetic resin or the like by means of monoblock molding.

Figure 27A:
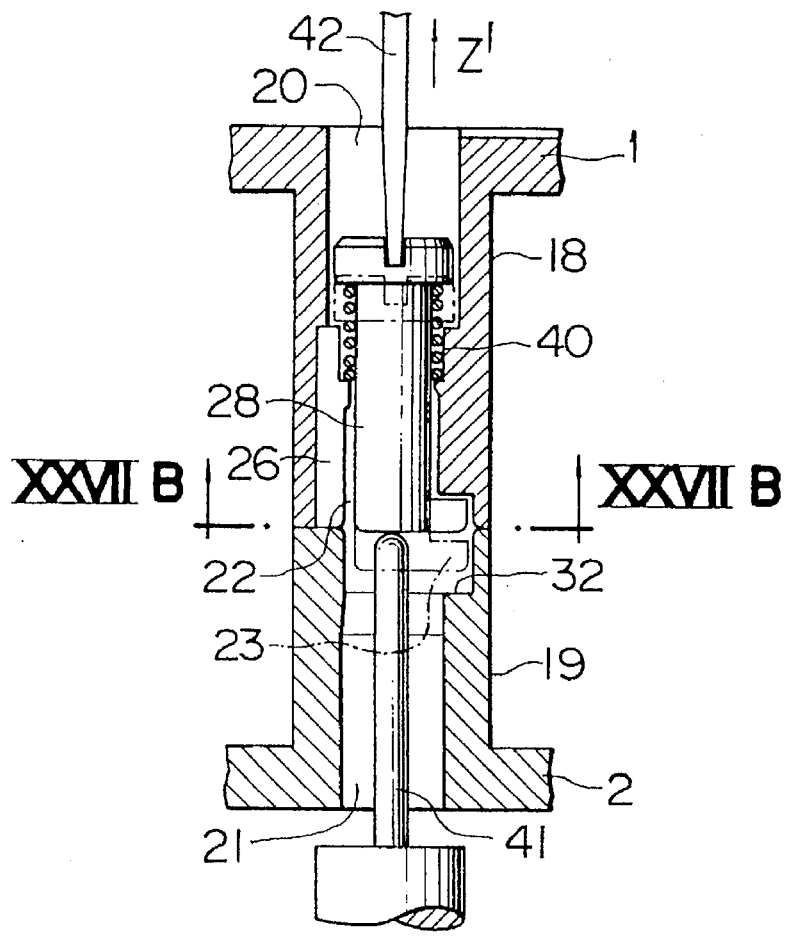
FIG. 27A is a (sectional) view showing the assembly and fitting of the component parts of a tape cassette according to a third embodiment of the present invention when a detection plug is held in its lower position.
Figure 27B:
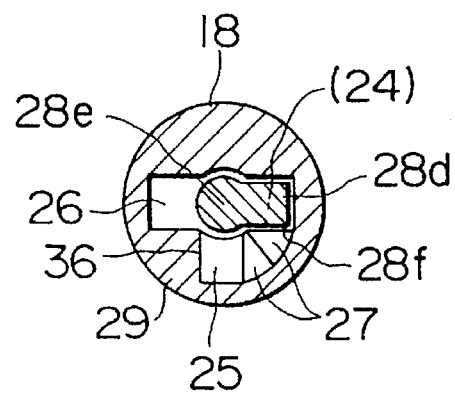
FIG. 27B is an assembly cross-sectional view along line XXVIIB—XXVIIB of FIG. 27A of the component parts of the third embodiment of the invention when the detection plug is held in its lower position.
Figure 33:
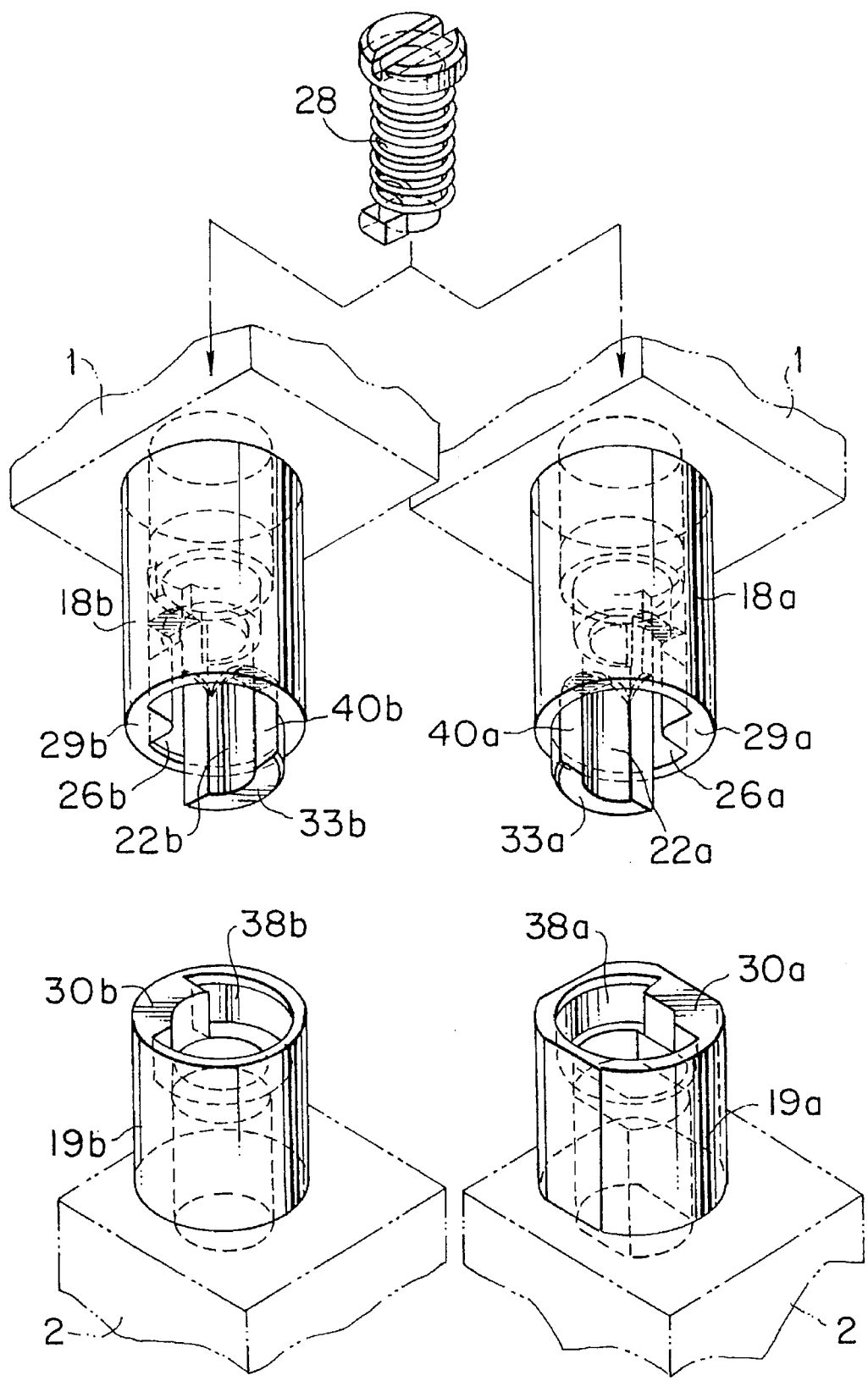
FIG. 33 contains two views one of which is a disassembled perspective view of the first embodiment of the invention showing essential portions of the component parts thereof (on the second standard side) and the other of which is a disassembled perspective view of the first embodiment of the invention showing essential portions of the component parts thereof (on the first standard side)

On the other hand, through holes 20a (20b) (20 of FIG. 27A) and 21a (21b) (21 of FIG. 27A) into which the plug 28 is to be inserted are joined by fastening together with screw or the like cylinder portions 18a (18b) and 19a (19b) formed by monoblock molding in upper and lower halves 1 and 2 made of a synthetic resin or the like. The cylinder portion 18a (18b) of the upper half 1 is formed inside thereof with the cylindrical through hole 20a (20b), a groove 26a (26b) extending from the through hole vertically downwards, a stepped portion 31a (31b) serving to restrict the lower end position of the compression coiled spring 40, a slit-like positioning portion 24a (24b) for the plug lower end protrusion 28d located in a different position from the vertical groove 26 in terms of both angular and vertical positions, and another slit-like positioning portion 25a (25b) the angular and vertical positions of which differ from those of the slit-like positioning portion 24a (24b), a triangular crest portion 27 (27a, 27b of FIG. 28) being formed additionally between the slit-like positioning portion 24 and 25. While the cylinder portion 19a (19b) of the lower half 2 is formed inside thereof with a cassette casing positioning and sensor insertion hole 21a (21b) and a sphere 23a (23b) in which the plug lower end protrusion 28d can be moved freely up and down and rotated about its axis. In case that the cylinder portions 18 and 19 of the upper and lower halves 1 and 2 are to be joined together to form a through hole 22 (22a, 22b of FIG. 28), surfaces 34 and 36 (34a, 36a, 34b, 36b of FIG. 28) formed in the upper half for serving to restrict the rotation of the plug lower end protrusion 28d are aligned with surfaces 35 and 37 (35a, 37a, 35b, 37b of FIG. 28) formed in the lower half 2 for serving to restrict the same. Further, as shown in FIG. 33, a substantially semicircular rib 33a (33b) and a plug rotation restricting surface 40a (40b) are formed integrally with an end surface 29 (29a, 29b of FIG. 28) of the cylinder portion 18 of the upper half 1 so as to extend vertically, and a concave portion 38a (38b) in which the above-described vertical rib is to be fitted is formed in an end surface 30a (30b) of the cylinder portion 19 of the lower half 2.

Figure 30A:
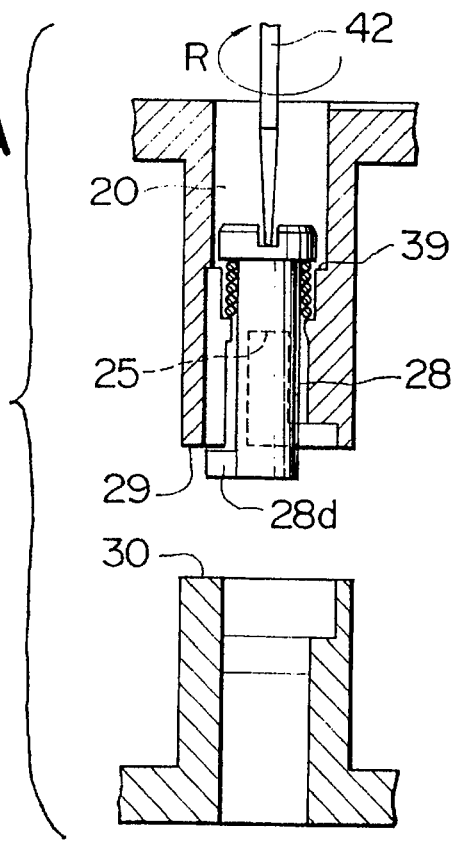
FIG. 30A is an assembly (sectional) view of the component parts (upper and lower halves) of the same embodiment when the plug is being set.
Figure 30B:
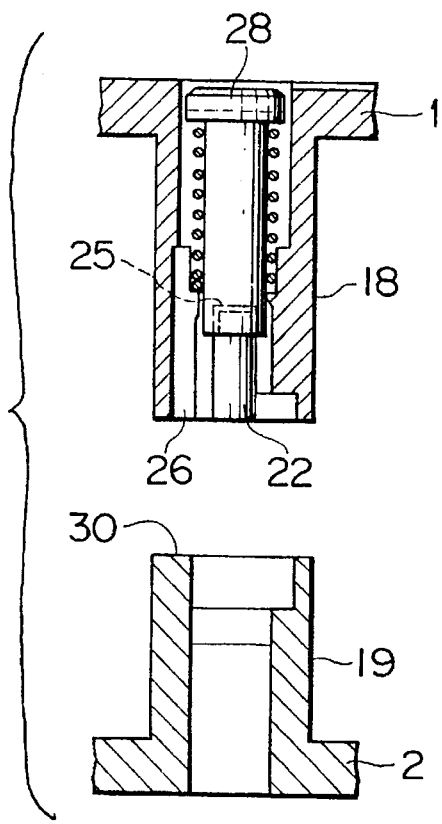
FIG. 30B is a view showing the assembly and fitting of the component parts (upper and lower halves) of the same embodiment.
Figure 31A:
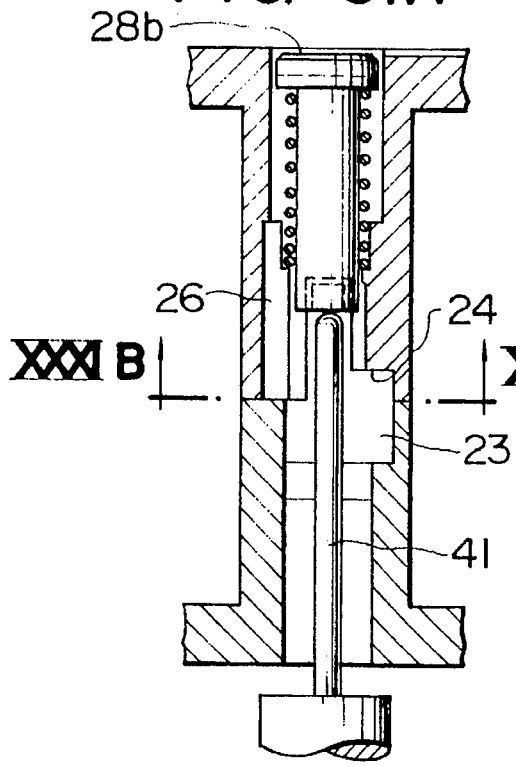
FIG. 31A is a detailed (sectional) view showing the assembly and fitting of the component parts of the same embodiment when the detection plug is held in its upper position.
Figure 31B:
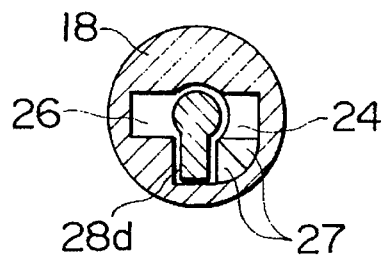
FIG. 31B is a cross-sectional view, along line XXXIB—XXXIB of FIG. 31A, showing the assembly and fitting of the component parts of the same embodiment when the detection plug is held in its upper position.

According to the plug 28 and the through hole 22 constructed as described above, as shown in FIGS. 29A, 29B, 30A and 30B, the lower horizontal protrusion 28d of the plug can be engaged with and inserted into the through hole 20 and the vertical groove 26a (26b) of the upper half 1 against the compression coiled spring 40. As the plug 28 is inserted vertically downwards by means of a screw-driver 42 the tip end of which is brought into engagement with the tool insertion groove 28b of the crown portion 28a, the lower end of the spring is restricted by a horizontal stepped portion 31. As the plug 28 is further displaced downwards in the direction of z, the plug crown portion 28a is restricted by a horizontal stepped portion 29 with the horizontal protrusion 28d at the lower end of the plug being displaced below the end surface 29 of the cylinder portion 18. In this case, by rotating in the direction R through 90°, for example, as shown in FIGS. 30A and 30B, the plug lower end portrusion 28d is brought into engagement with the slit formed in the upper half 1 and displaced elastically up to the positioning portion 25 due to the spring force. In this state, as the upper and lower halves 1 and 2 are fastened together with screws or the like, the cylinder portions 18 and 19 are coupled (joined) together so that the vertical insertion groove 26 for the plug lower end protrusion 28d in the upper half 1 is covered with an upper end surface 30 of the cylinder portion 19 so as to prevent the plug 28 (28d) from coming off from the cassette casing 6.

In consequence, the plug 28 can be inserted and fitted into the through hole 20 (22) very easily and reliably so as to be located at the upper position thereof in the cassette casing.

Figure 32:
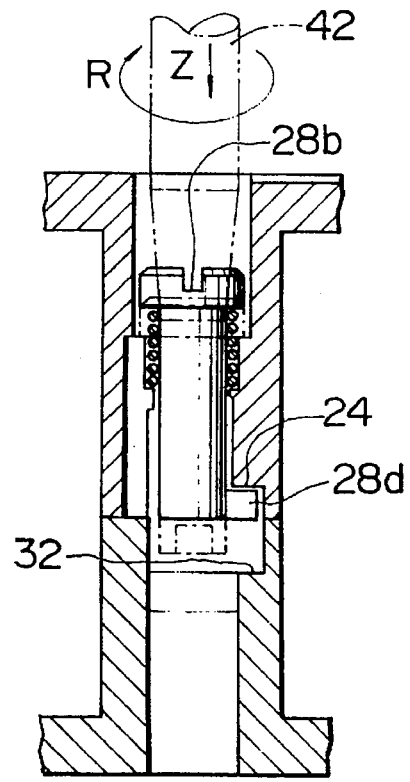
FIG. 32 is a detailed (sectional) view showing the assembly and fitting of the component parts of the same embodiment when the detection plug is held in its lower position.

Next, as shown in FIG. 32, as the screw-driver is inserted in the tool insertion groove 28b at the top end of the plug so as to displace the plug lower end protrusion 28d down to a lower end restricting position 32 (32a, 32b, of FIG. 28) in the direction of z against the spring force and rotate in the direction of the arrow R through about 90°, the plug is positioned at the lower position 24. If it is tried to further rotate in this state, the rotation restricting surfaces 34, 35 and 52 contribute to the prevention of excessive rotation.

When it is intended to change the plug 28 in the through hole 22, 23 from the lower position 24 to the upper position 25, the plug 28 is displaced down to the lower plug position restricting surface 32 and rotated counterclockwise through 90° while going over the triangular crest rib 27 on the way and, thereafter, displaced upwards due to the elastic biasing force of the spring 40.

In this way, by changing selectively between the through holes 22 and 23 as shown in FIGS. 31A, 31B, 27A and 27B, it is possible to change the distance from the lower surface of the cassette casing to the plug lower end 28e by extremely easy and exact operations such as to press vertically, rotate in one direction, restrict the position and the like.

Figure 18:
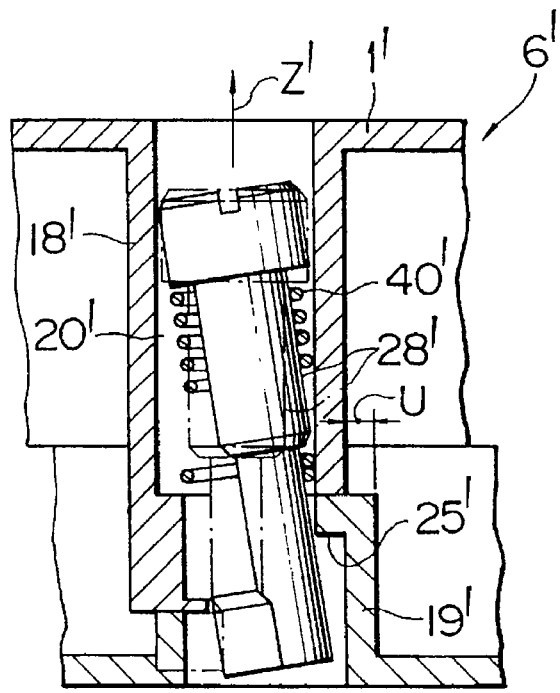
FIG. 18 is a detailed (sectional) view showing the assembly and fitting of the component parts concerned with the same subject when the cassette casing is brought into an unexpected state.
Figure 19:
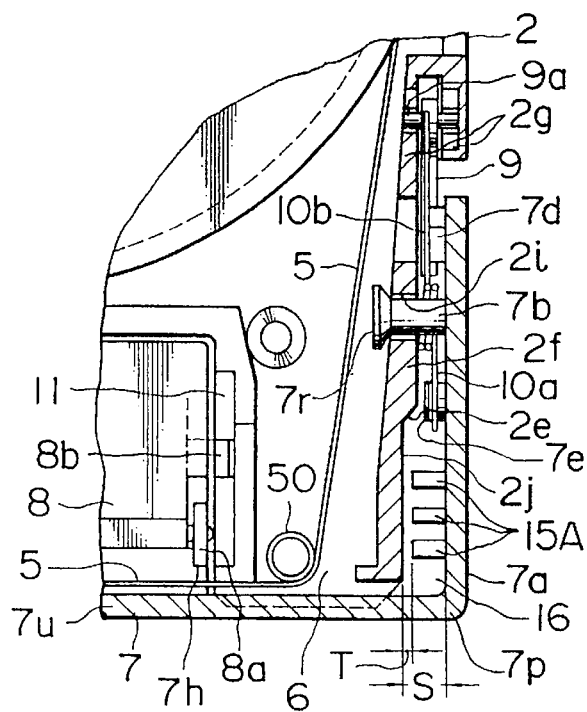
FIG. 19 is an assembly sectional view showing essential portions of component parts of a tape cassette according to a first embodiment of the present invention.
Figure 20A:
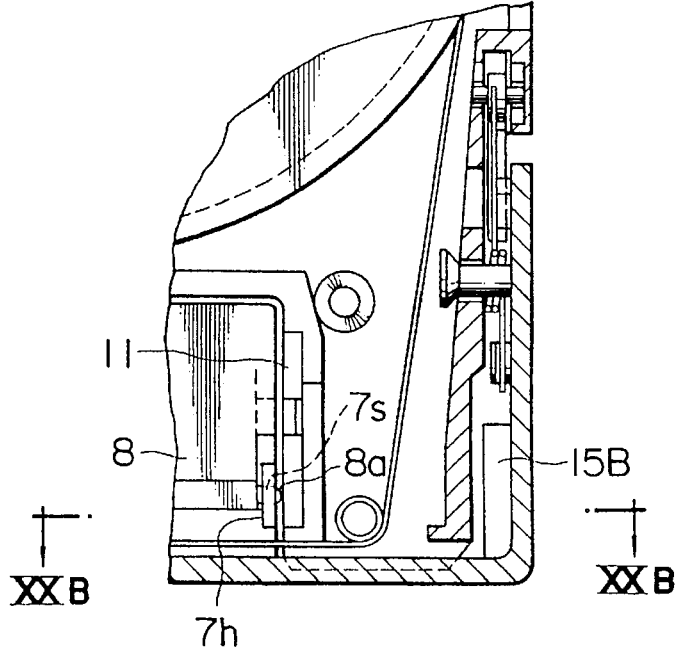
FIG. 20A is an assembly sectional view showing essential portions of the component parts of the first embodiment of the invention.
Figure 20B:
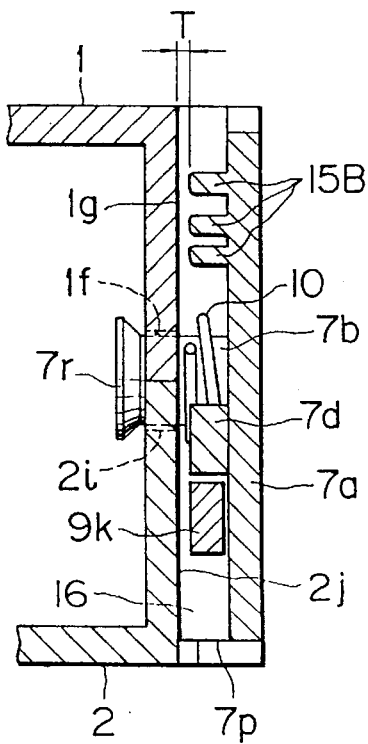
FIG. 20B is a vertical sectional view, along line XXB—XXB of FIG. 20A, showing essential portions of the component parts of the same embodiment of the invention.
Figure 21:
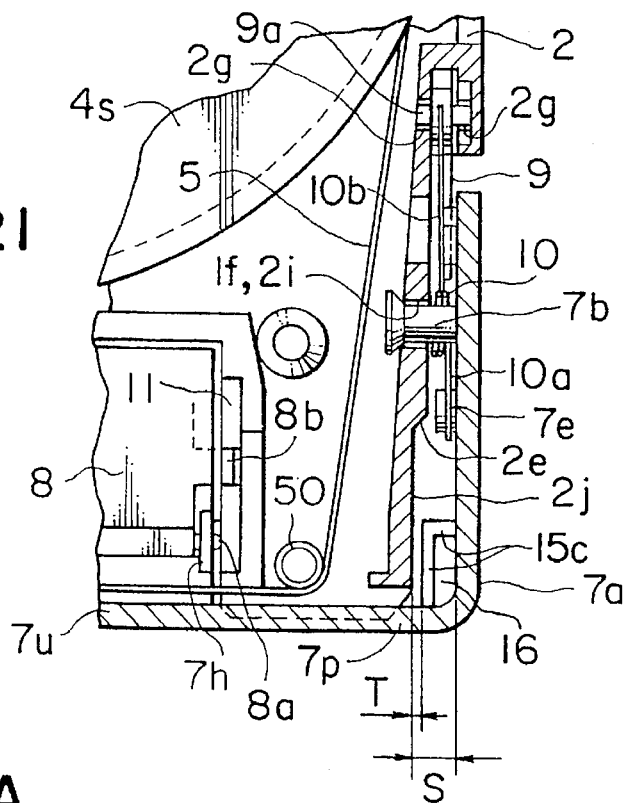
FIG. 21 is an assembly sectional view showing essential portions of the component parts of the first embodiment of the invention.
Figure 22A:
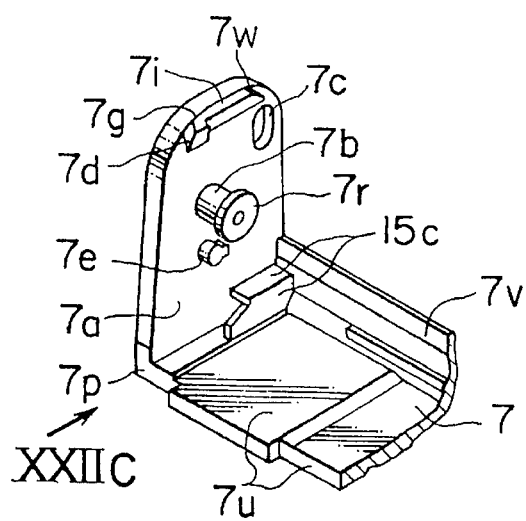
FIG. 22A is a perspective view showing essential portions of the component parts of the same embodiment.
Figure 22B:
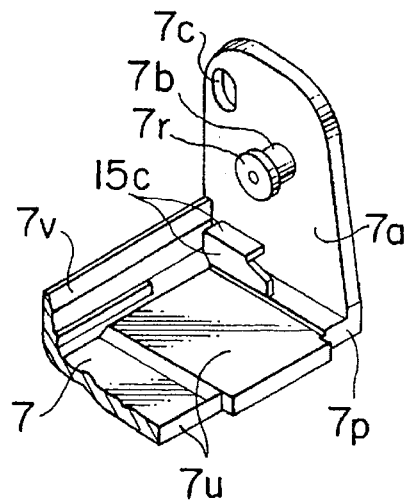
FIG. 22B is a perspective view showing essential portions of the component parts of the same embodiment.
Figure 22C:
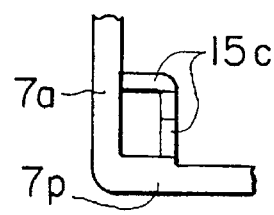
FIG. 22C is a view of the component parts of the same embodiment, as seen from the direction of an arrow XXIIC.
Figure 23:
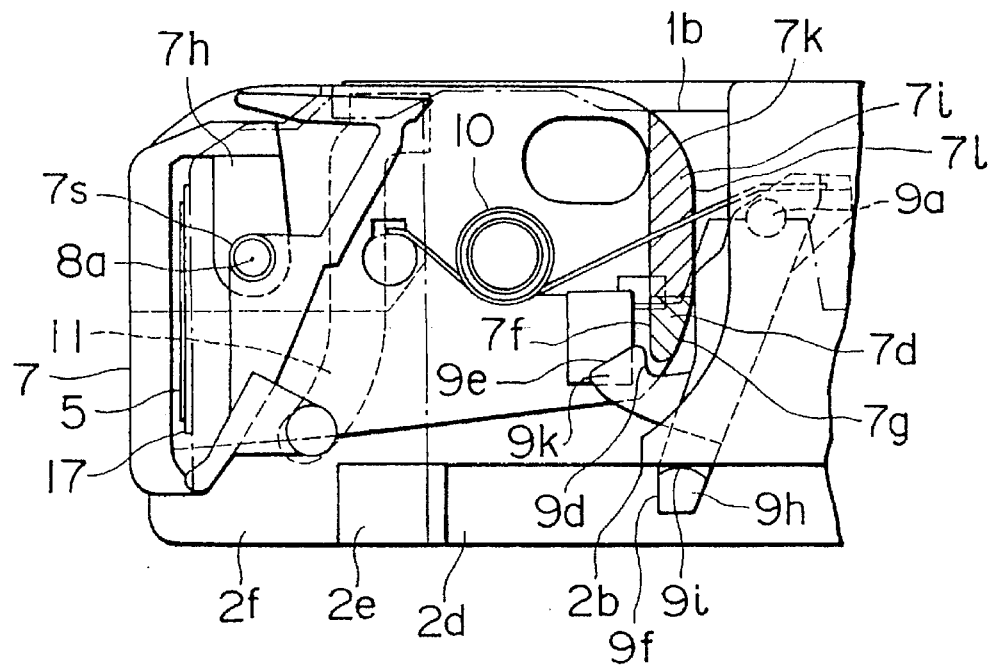
FIG. 23 is an assembly sectional view showing essential portions of the component parts of a tape cassette according to a second embodiment of the invention (when a front cover is closed)

Further, as shown in FIGS. 33A and 33B, the upper and lower cylinder portions 18 and 19 are formed with the vertical circular rib 33 and concave portion 38 which is to be fitted on the vertical rib 33, respectively. By fastening together these cylinder portions 18 and 19 with screws or the like, it is possible to prevent unexpected lateral displacement and deformation shown in FIG. 18, thereby preventing the serious defect such as disengagement of the plug or the like.

Next, the through hole formed at the center of the rear part of the cassette casing 6 and the plug to be inserted therein are the quite same except the lengths of the cylinder portions 18 and 19 formed integrally with the upper and lower halves 1 and 2 and the length of the plug 28, and therefore, explanation thereof will be omitted.

The present invention has been described above in conjunction with an embodiment, and however, the invention is not limited to this embodiment but can be modified variously and effectively based on the technical idea of this invention.

For example, in the present embodiment, the vertical semicircular rib 33 is formed on the cylinder portion end surface 29 and the rib fitting concave portion 38 is formed in the other cylinder portion surface 30 with which the surface 39 is brought into engagement, and however, the semicircular shape is not limitative. Further, the plug positioning portion is not limited in number to two as shown in the embodiment but can be modified variously in number and configuration.

Incidentally, the present invention is applicable not only to the tape cassette for use in the video tape recorder but also to tape cassettes for use in various recording/reproducing apparatus which record and reproduce various information by means of various recording and reproducing methods.

As described above, according to the present invention, the plug can be inserted into the through hole very easily and exactly and, at the same time, since the through hole, the plug receiving portion and the plug can be all formed by metal molds of simple structure, the cost can be reduced remarkably. In addition, even in case of positioning the plug in the plural points, the changing operation can be performed easily and exactly. Further, since the cylinder portions can be coupled firmly with each other, it is possible to prevent the data defects that the plug is caused to rotate unexpectedly in the plural upper and lower positions and that the plug is disengaged from the cassette casing, thereby making it possible to position the plug at the plural stepped portions without fail. This makes it possible to transmit the information adequately from the cassette to the VTR or the like via a sensor pin 41.

A third embodiment will be described with reference to the drawings.

The cylinder portion 18a (18b) of the upper half 1 is formed inside thereof with the cylindrical through hole 20a (20b), the groove 26a (26b) extending from the through hole vertically downwards, the stepped portion 31a (31b) serving to restrict the lower end position of the compression coiled spring 40, another stepped position 39a (39b), the slit-like positioning portion 25a (25b) for the plug lower end protrusion 28d located in a different position from the vertical groove 26 in terms of both angular and vertical positions, and another slit-like positioning portion 24a (24b) the angular and vertical positions of which are differed from those of the positioning portion 25 (a & b), the triangular crest projection 27 being formed additionally between the slit-like positioning portions 24 and 25.

Figure 34A:
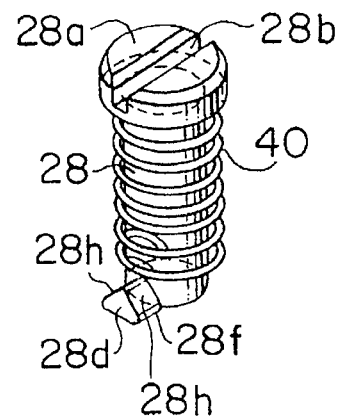
FIG. 34A is a perspective view of the component part (detection plug) of the same embodiment.
Figure 34B:
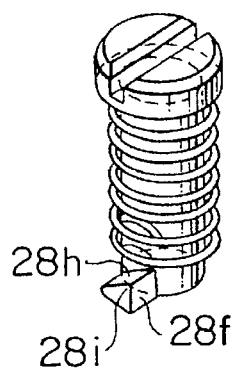
FIG. 34B is a perspective view of the component part (detection plug) of the same embodiment.
Figure 34C:
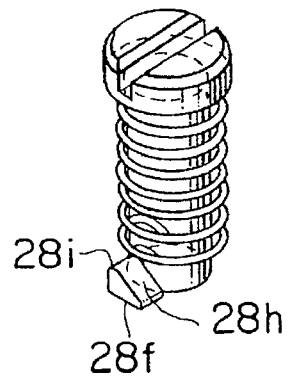
FIG. 34C is a perspective view of the component part (detection plug) of the same embodiment.

FIGS. 34A to 34C show several embodiments of the plug in which the upper surface portion of the horizontal protrusion 28d formed at the lower end of the plug so as to be opposed to the vertically downward crest-like projection 27 of the upper half 1, is formed in the substantially triangle pole. The projecting portion is formed integrally by tapered surfaces 28h which are pushed up toward the center as shown in FIG. 34A, raised gradually to the right as shown in FIG. 34B or lowered gradually to the right as shown in FIG. 34C while being formed with a round tip end 28i on the upper extension of the tapered surfaces, and the coiled spring 40 is fitted on the cylinder portion between the crown portion 28a and the lower end protrusion 28d. These embodiments are alternatives to that of FIG. 28, with top surface 28c and side surface 28f.

Figure 35A:
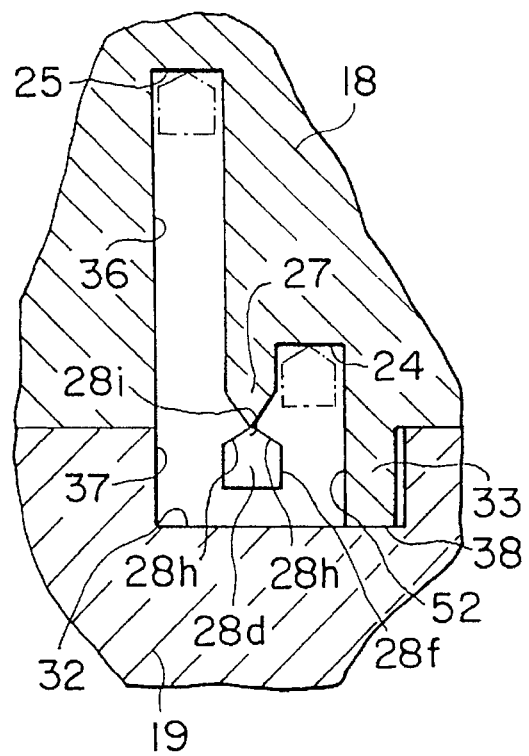
FIG. 35A is a development showing the fitting of the component parts (plug, upper and lower halves) of the same embodiment (when a vertical rib is formed)
Figure 35B:
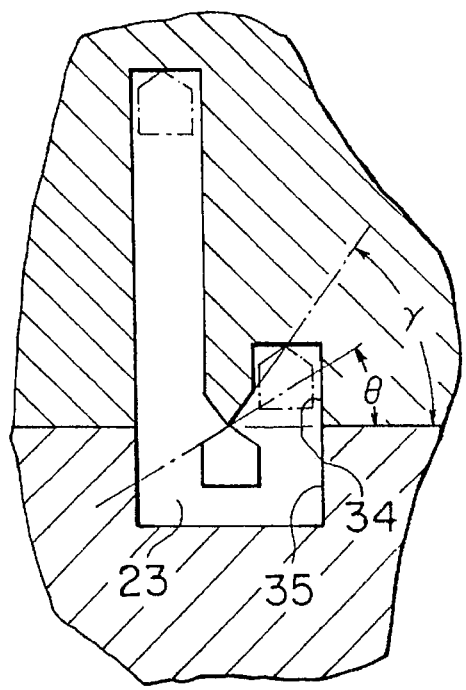
FIG. 35B is a development showing the fitting of the component parts (plug, upper and lower halved) of the same embodiment (when the vertical rib is not formed)

FIGS. 35A and 35B are developments showing a part of the upper surface of the plug lower end protrusion 28d consisting of the tapered surfaces 28h pushed up toward the center as shown in FIG. 35A and of the round tip end 28i formed at the center, a part of the vertically downward crest-like projection 27 of the upper half 1, the movable space defined by the upper and lower halves 1 and 2, and part of the upper positioning (restricting) portion 25 (a & b) and lower positioning (restricting) portion 24 (a & b).

Incidentally, FIG. 35A shows the state of engagement between the cylinder portion 18 of the upper half 1 and the cylinder portion 19 of the lower half 2 in which the vertical circular rib 33 formed integrally with the end surface 29 of the cylinder portion 18 is fitted in the concave portion 38 formed in the upper end surface portion 30 of the cylinder portion 19, and FIG. 35B shows the sate of engagement between them in which the vertical rib 33 and the concave portion 38 are dispensed with.

In FIGS. 35A and 35B, the upper tapered surface 28h of the plug lower end portrusion 28d makes an inclination θ with the horizontal while the vertically downward crest-like projection 27 of the upper half 1 makes an inclination γ with the horizontal, and the plug and the upper and lower halves are so formed as to satisfy the relation γ>θ or γ<θ. FIGS. 35A and 35B show the state in the course of changing the plug lower end protrusion 28d to the upper or lower position. As the tip end of the screw-driver 42 or the like is brought into engagement with the grooved portion 28b formed in the crown portion 28a so as to move vertically and rotate clockwise (or counterclockwise) through about 90° about the axis, even if the rotation is stopped unexpectedly during the rotation at an angle of 45° or so, for example, when the upper tapered surfaces 28h and the round tip end 28i of the plug lower end protrusion 28d are to be brought into engagement with the downward triangular rib 27 formed in the half receiving portion, they are caused to slip in point or line contact with each other because they each have limited horizontal portions, with the result in that the plug lower and protrusion 28d can be received by force in either of the upper position 25 (a & b) and the lower position 24 (a & b). In consequence, the plug 28 is allowed to exist only at the height of the fixed position.

In FIGS. 35A and 35B, the upper tapered surfaces 28h of the lower end protrusion and the tapered surfaces of the downward triangular rib 27 of the half are illustrated as being flat surfaces, and however, this is not limitative but may be replaced by curved surfaces. It is preferred that the radius of curvature of the round tip end 28i is made smaller from the viewpoint of the contact sliding ability.

Figure 36A:
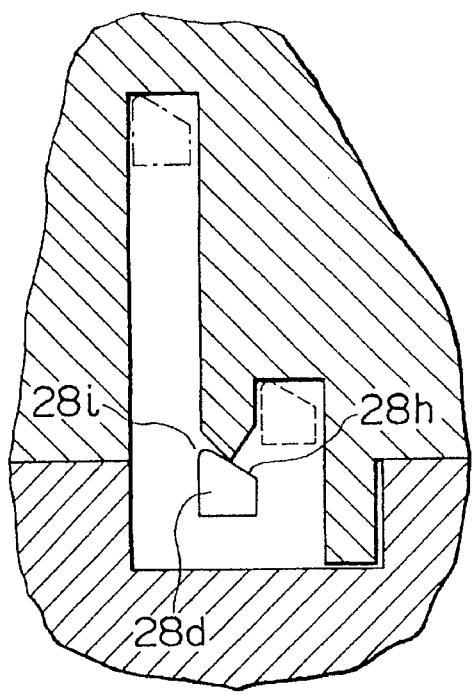
FIG. 36A is a development showing the fitting of the component parts of another embodiment (when a vertical rib is formed)
Figure 36B:
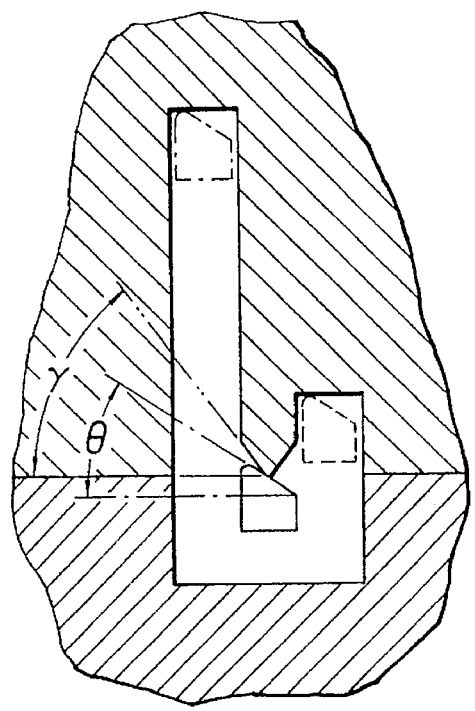
FIG. 36B is a development showing the fitting of the component parts of another embodiment (when the vertical rib is not formed)
Figure 37A:
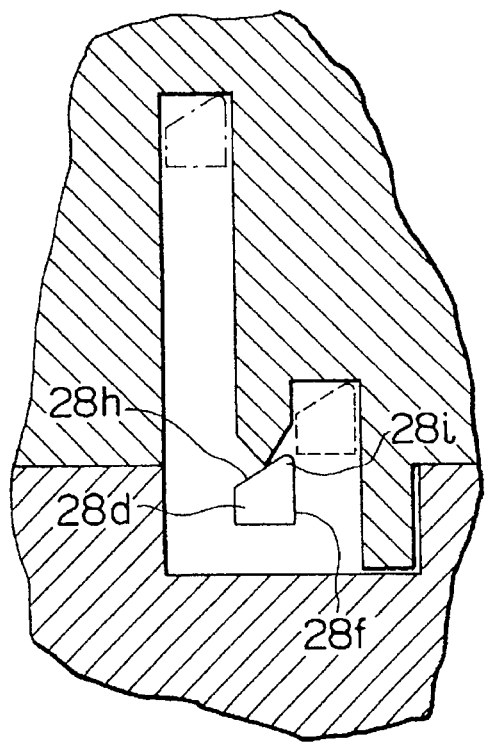
FIG. 37A is a development showing the fitting of the component parts of still another embodiment (when a vertical rib is formed)
Figure 37B:
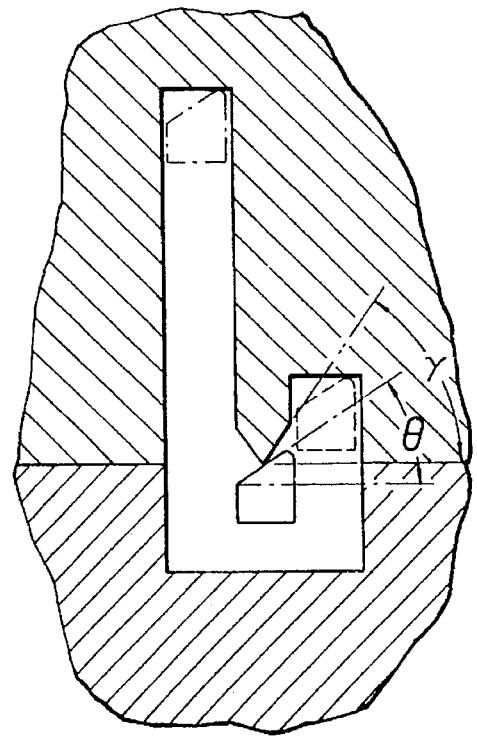
FIG. 37B is a development showing the fitting of the component parts of still another embodiment (when the vertical rib is not formed)

Next, FIGS. 36A, 36B and 37A, 37B show different embodiments, respectively. The upper surface 28h of the plug lower end protrusion makes an inclination θ with the horizontal and the round tip end 28i is formed on the upper extension of the tapered surface, and the plug and the upper and lower halves are so formed as to satisfy the relation γ>θ or γ<θ like the embodiment shown in FIGS. 35A and 35B. Even if the tapered surface is formed to be lowered gradually to the right as shown in FIGS. 36A and 36B or to be raised gradually to the right as shown in FIGS. 37A and 37B, the quite same effects can be obtained, with the result that the plug lower end portrusion can be received by force in the upper position 25 or the lower position 24 like the embodiment shown in FIGS. 35A and 35B.

In addition, the plug positioning portion is not limited in number to two as shown in the embodiments but can be modified variously in number and configuration.

Furthermore, a fourth embodiment of the present invention will be described with reference to the drawings.

Figure 38:
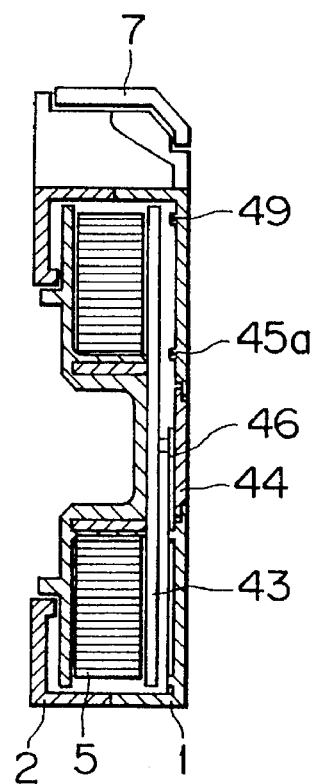
FIG. 38 is an assembly sectional view of the component parts of a fourth embodiment of the present invention showing the position in which a reel mount is set.

Referring to FIG. 38, the cassette main body 6 consists of the upper half 1 and the lower half 2, and the upper and lower halves 1 and 2 are coupled with each other from above and below so as to form a united casing.

A pair of reels 3 and 4 on which the magnetic tape 5 is wound are encased in the cassette, and the reel 3 (4) and a reel flange 43 are welded to each other to become a single body. A clear window 44 through which the amount of the remaining tape is to be confirmed is welded to the upper half 1. A leaf spring 46 is attached to the upper half 1 so as to press the reel 3 (4) and the reel flange 43 toward the lower half 2. Further, the magnetic tape 5 stretched in the opening portion of the cassette is protected by the front cover 7.

Figure 39:
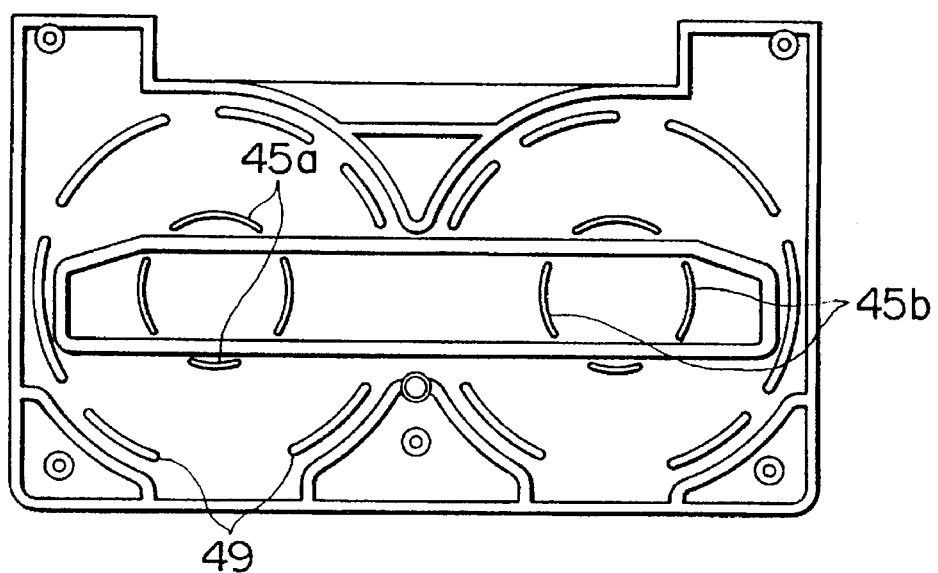
FIG. 39 is a plan view of the component parts (upper half, clear window) of the same embodiment (showing vertical circumferential ribs).

As shown in FIG. 39, inside the upper half, ribs 45a and 45b are arranged on the inner surface of the upper half 1 and on the inner surface of the clear window 44, respectively, centering around the center of each reel. The ribs 45a and 45b are formed on the same circumference with a diameter equal to that of the reel hub while being made equal to each other in height. Further, ribs 49 formed on the inner surface of the upper half 1 are arranged on a circumference with a diameter a little smaller inwardly than that of the reel flange while being made lower than the ribs 45a and 45b in height. Tip ends of the ribs 45a, 45b and 49 are each rounded variously lest they should be damaged in case of contact.

Operation of the tape cassette having the above construction will be described below.

As the tape cassette 6 is loaded in the video tape recorder, the reel 3 (4) and the reel flange 43 are lifted by a fixed amount with respect to the upper half 2 and held in that state. In this case, a gap is to be maintained between the ribs 45a, 45b and 49 and the reel flange 43.

However, when the tape cassette 6 is not loaded in the video tape recorder, the reel 3 (4) and the reel flange 43 are allowed to move between the lower half 2 and the ribs 45a and 45b formed on the inner surface of the upper half 1.

When this is the case, if the reel 3 (4) and the reel flange 43 move in parallel with the upper and lower halves 1 and 2, it is possible to regulate the movement by the ribs 45a and 45b. Further, even when they move inclinedly, due to the difference in height between the ribs 45a, 45b and the ribs 49, the movement of the reel 3 (4) and the reel flange 43 can be first regulated by the ribs 45a, 45b and then the inclination thereof can be regulated by the ribs 49, with the result that the reel 3 (4) and the reel flange 43 can be prevented from coming in contact with the magnetic tape.

As described above, according to this embodiment, since the ribs are formed on the inner surfaces of the upper half and the clear window at positions located on the circumference with the diameter equal to that of the reel hub and the circumference with the diameter equivalent to the outside diameter of the reel flange, it is possible to prevent the tape from being damaged due to contact with the reel or the reel flange.

It is noted that although the ribs 45a, 45b and 49 are divided in this embodiment, they may be formed continuously.

As has been described above, according to the present invention, by arranging on the inner surfaces of the upper half in which the reels are incorporated and of the clear window the ribs at positions located on the circumference with the diameter equal to that of the reel hub and the circumference with the diameter equivalent to the outside diameter of the reel flange, it is possible to realize an excellent tape cassette in which the tape can be prevented from being damaged due to contact with the reel and the reel flange attributable to the deformation of the reel flange.

What is claimed is:

1. A tape cassette comprising:

a cassette casing comprising an upper half and a lower half, said upper half having an inner surface;

a pair of reels disposed rotatably in said cassette casing, each reel of said pair of reels comprising a reel hub and a reel flange extending radially outwardly from said reel hub; and a reel spring disposed in the upper half of said cassette casing and brought into contact with each reel of said pair of reels while being urged elastically toward the lower half so as to serve to press said pair of reels;

wherein said upper half comprises regulating ribs projecting from the inner surface of the upper half, said regulating ribs comprising (i) at least one first rib in a first position opposite to the reel hub of said each reel of said pair of reels and (ii) at least one second rib in a second position directly above an outer periphery of said reel flange of said each reel of said pair of reels within a radial extent of each said reel flange, a height of the at least one first rib being greater than a height of the at least one second rib, said at least one first rib and said at least one second rib having shapes of circular arcs.

2. A tape cassette according to claim 1, wherein the regulating ribs have rounded tip ends.

3. A tape cassette according to claim 1, wherein:

each reel of said pair of reels has a center; and each of said circular arcs is an arc of a circle centered over said center of one reel of said pair of reels.

4. A tape cassette according to claim 1, further comprising a clear window set in said upper half, said clear window having at least one third rib arranged in a third position opposite to the reel hub of said each reel of said pair of reels.

5. A tape cassette according to claim 4, wherein said at least one third rib has a height equal to said height of said at least one first rib.

* * * * *